United States Patent
Chen

(10) Patent No.: US 9,253,750 B2
(45) Date of Patent: Feb. 2, 2016

(54) LOCATION MODEL UPDATING APPARATUS AND LOCATION ESTIMATING METHOD

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/459,404

(22) Filed: Aug. 14, 2014

(65) Prior Publication Data

US 2015/0094087 A1   Apr. 2, 2015

(30) Foreign Application Priority Data

Sep. 27, 2013   (JP) .................................. 2013-202016

(51) Int. Cl.
*H04W 24/00* (2009.01)
*H04W 64/00* (2009.01)
*G01S 5/00* (2006.01)

(52) U.S. Cl.
CPC . *H04W 64/00* (2013.01); *G01S 5/00* (2013.01)

(58) Field of Classification Search
CPC ................................ H04W 4/02; H04W 64/00
USPC ........... 455/456.1, 452.1, 453, 436, 525, 437, 455/434, 522, 426.1, 435.2, 524, 450; 370/336, 331, 332, 252, 342
See application file for complete search history.

(56) References Cited

U.S. PATENT DOCUMENTS

2013/0017840 A1 * 1/2013 Moeglein et al. .......... 455/456.1
2014/0136696 A1 * 5/2014 Leppanen et al. ............ 709/224

FOREIGN PATENT DOCUMENTS

| JP | 2009-055138 | 3/2009 |
| JP | 2009-272742 | 11/2009 |
| JP | 2011-058928 | 3/2011 |
| JP | 2013-059237 | 3/2013 |

* cited by examiner

*Primary Examiner* — Dhaval Patel
(74) *Attorney, Agent, or Firm* — Fujitsu Patent Center

(57) ABSTRACT

A location model updating apparatus updates a location model based on data uploaded from a mobile terminal. A certainty of data observed at a location having a location name designated by a user is computed based on a previous histogram, for each most recent check-in data uploaded during a time from previous to current histogram updating, and a most recent histogram is generated based on the certainty. The location is detected using the previous histogram, based on a received signal strength included in each most recent check-in data, in order to judge whether the check-in data is correct, depending on whether a location name of the detected location matches the location name designated by the user and included in each most recent check-in data.

15 Claims, 22 Drawing Sheets

FIG.4

| AP NUMBER | MAC ADDRESS OF AP | AP COVERING LOCATION LIST | | | |
|---|---|---|---|---|---|
| | | | | | |
| 1 | M1 | LOCATION NAME L1 | LOCATION NAME L2 | LOCATION NAME L3 | ...... |
| 2 | M2 | LOCATION NAME L1 | LOCATION NAME L2 | LOCATION NAME L3 | ...... |
| ... | ... | ... | ... | ... | ... |

| LOCATION NUMBER | LOCATION NAME | THRESHOLD VALUE | OBSERVABLE AP LIST (200) ||||||||||||||||
|---|---|---|---|---|---|---|---|---|---|---|---|---|---|---|---|---|---|
| | | | MAC ADDRESS |||||| MAC ADDRESS |||||| MAC ADDRESS ||||||
| | | | MISSING PROBA-BILITY | OBSERV-ING PROBA-BILITY | OBSERVING PROBABILITY FOR EACH STRENGTH LEVEL |||| MISSING PROBA-BILITY | OBSERV-ING PROBA-BILITY | OBSERVING PROBABILITY FOR EACH STRENGTH LEVEL |||| MISSING PROBA-BILITY | OBSERV-ING PROBA-BILITY | OBSERVING PROBABILITY FOR EACH STRENGTH LEVEL ||||
| | | | | | 1 | 2 | 3 | 4 | | | 1 | 2 | 3 | 4 | | | 1 | 2 | 3 | 4 |
| 1 | L1 | | | | | | | | | | | | | | | | | | | |
| 2 | L2 | | | | | | | | | | | | | | | | | | | |
| ... | | | | | | | | | | | | | | | | | | | | |

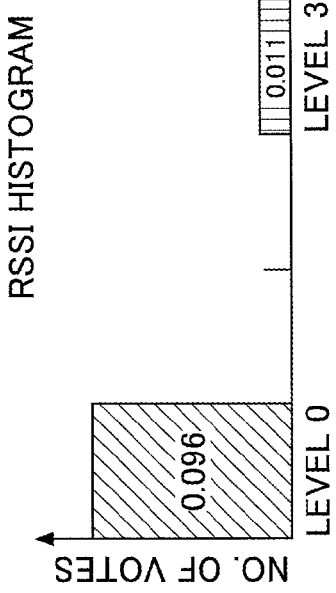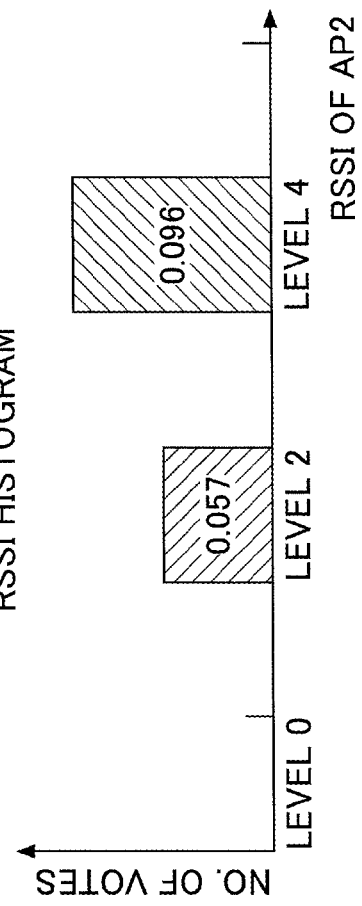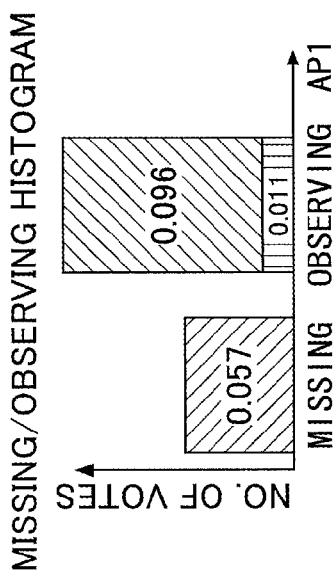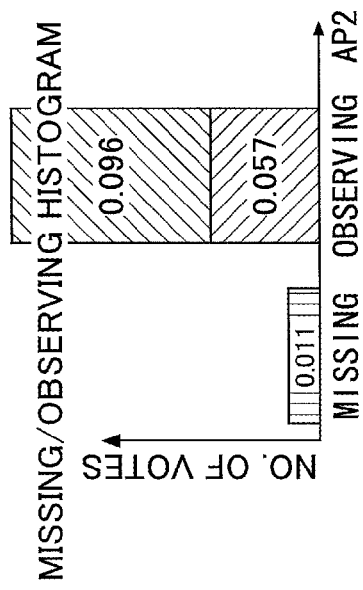

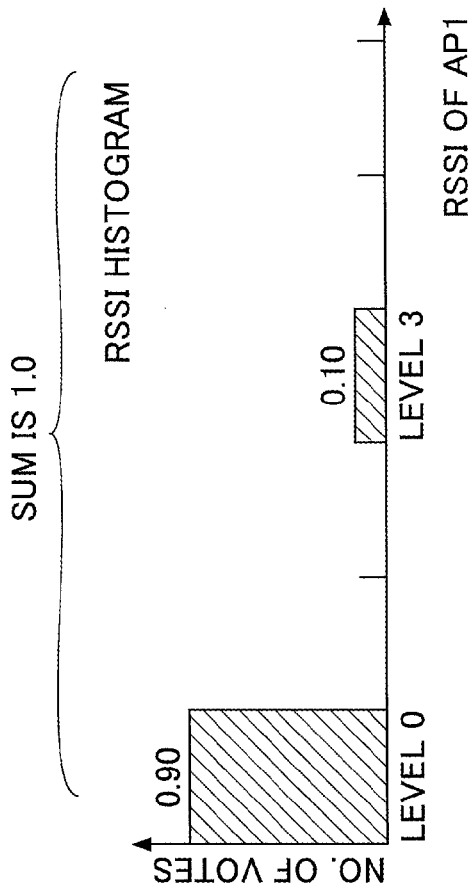
FIG.13A
FIG.13B
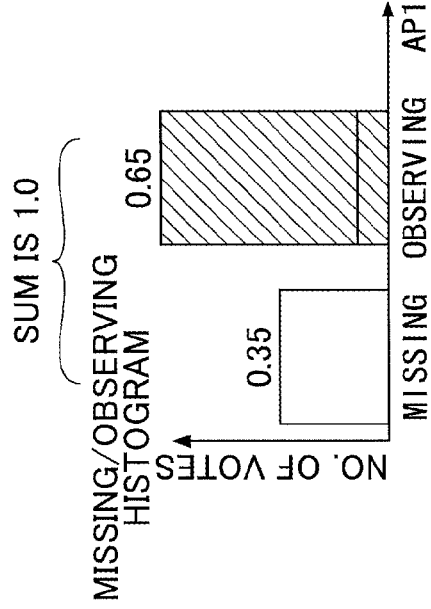
FIG.13C
FIG.13D
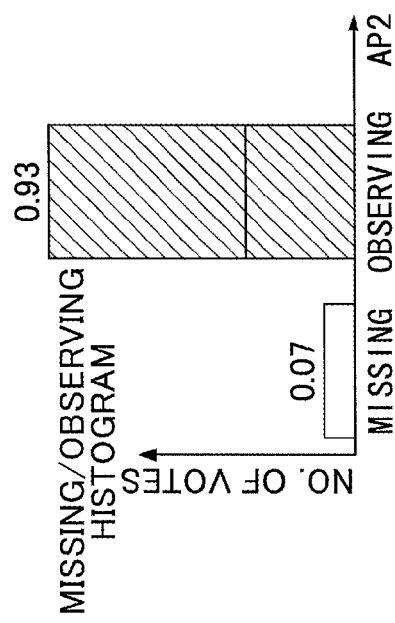
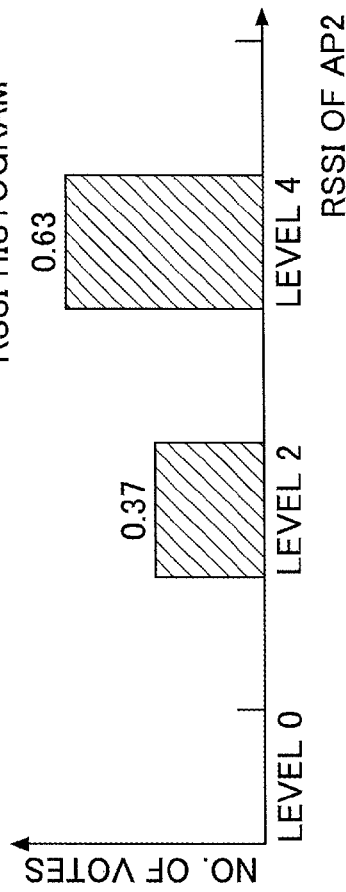

FIG.14

| CHECK-IN DATA | RSSI DATA | LOCATION NAME DESIGNATED BY USER | LIKELIHOOD OF LOCATION L1 | LIKELIHOOD OF LOCATION L2 | DETECTED LOCATION | CORRECT CHECK-IN DATA |
|---|---|---|---|---|---|---|
| CHECK-IN DATA C1 | RSSI(AP1) = LEVEL 3, AP2=MISSING | L1 | 0.011 | 0.042 | LOCATION L2 | × |
| CHECK-IN DATA C2 | AP1=MISSING, RSSI(AP2) = LEVEL 2 | L1 | 0.057 | 0.020 | LOCATION L1 | ○ |
| CHECK-IN DATA C3 | RSSI(AP1) = LEVEL 0, RSSI(AP2) = LEVEL 4 | L1 | 0.096 | 0.007 | LOCATION L1 | ○ |

FIG.19

| CHECK-IN DATA | RSSI DATA | LOCATION NAME DESIGNATED BY USER | LIKELIHOOD OF LOCATION L1 | LIKELIHOOD OF LOCATION L2 | DETECTED LOCATION | CORRECT CHECK-IN DATA |
|---|---|---|---|---|---|---|
| CHECK-IN DATA C4 | RSSI(AP1) = LEVEL 1, AP2=MISSING | L1 | 0.0168 | 0.0125 | LOCATION L1 | ○ |
| CHECK-IN DATA C5 | RSSI(AP1) = LEVEL 0, RSSI(AP2) = LEVEL 1 | L1 | 0.0306 | 0 | LOCATION L1 | ○ |
| CHECK-IN DATA C6 | RSSI(AP1) = LEVEL 1, RSSI(AP2) = LEVEL 5 | L1 | 0.0189 | 0.0035 | LOCATION L1 | ○ |
| CHECK-IN DATA C7 | RSSI(AP1) = LEVEL 0, RSSI(AP2) = LEVEL 2 | L1 | 0.153 | 0 | LOCATION L1 | ○ |
| CHECK-IN DATA C8 | AP1=MISSING, RSSI(AP2) = LEVEL 1 | L1 | 0.0168 | 0.013 | LOCATION L1 | ○ |
| CHECK-IN DATA C9 | AP1=MISSING, RSSI(AP2) = LEVEL 3 | L1 | 0.0168 | 0.020 | LOCATION L2 | × |

LOCATION MODEL UPDATING APPARATUS AND LOCATION ESTIMATING METHOD

CROSS-REFERENCE TO RELATED APPLICATIONS

This application is based upon and claims the benefit of priority of the prior Japanese Patent Application No. 2013-202016, filed on Sep. 27, 2013, the entire contents of which are incorporated herein by reference.

FIELD

The embodiments discussed herein are related to a location model updating apparatus, a location estimating method, and a computer-readable storage medium.

BACKGROUND

A position estimating technique has been proposed in which a mobile terminal makes wireless communications with a plurality of base stations, and estimates a location of the mobile terminal by utilizing attenuation of received signal strengths depending on a distance to the mobile terminal from each of the plurality of base stations. For example, the base station may be an AP (Access Point) used in WiFi (Wireless Fidelity, registered trademark).

According to such a position estimating technique, the mobile terminal collects, in advance, IDs (Identifiers) of the plurality of base stations and RSSIs (Received Signal Strength Indicators) received at each location. From the IDs of the plurality of base stations and values of the RSSIs received at each location, an RSSI feature vector that is uniquely determined for each location is created, and a location model is created for each location using the RSSI feature vector. The location model may make a reference to a database indicating the location where the signals are received from the base stations, the base stations from which the signals are received by the mobile terminal at the location, and the RSSIs of the signals received by the mobile terminal at the location. When estimating the location, the RSSIs of the signals received by the mobile terminal from the base stations are collated with the location model, in order to estimate the location of the mobile terminal. Generally, the location model may be created by methods such as the k-NN (k-Nearest Neighbor algorithm) method, probability method based on probability distribution, non-parametric method, pattern matching method, or the like.

In order to improve the position estimating accuracy, it is desirable to create the location model by learning from a large number of learning samples. However, in order to collect the large number of learning samples, an operator of a location detection system must collect RSSI samples by moving to all target locations, and the load on the operator to collect the RSSI samples increases as the number of target locations increases. Hence, in order to reduce the load on the operator, it may be conceivable to create an initial location model based on the RSSI samples collected at a relatively small number of locations, and to periodically update the initial location model, for example.

However, because the conceivable method collects the RSSI samples from the relatively small number of locations and creates the initial location model based on the collected RSSI samples, it is difficult to improve the position estimating accuracy based on the initial location model. In addition, in order to obtain reliable RSSI samples for use in updating the initial location model, the operator must move to the target locations and collect the RSSI samples. For this reason, the load on the operator increases as the number of target locations increases, similarly as in the case in which the location model is created. Further, when the RSSI samples collected by people other than the operator are used to update the initial location model, the initial location model may be updated by erroneous data since the reliability of the RSSI samples collected by the people other than the operator is unknown. If the initial location model is updated based on erroneous data, the position estimating accuracy deteriorates.

Accordingly, it is conventionally difficult to update the location model without increasing the load on the operator of the location detection system, or without deteriorating the position estimating accuracy.

Examples of the related art include Japanese Laid-Open Patent Publications No. 2011-58928, No. 2009-272742, and No. 2009-55138.

SUMMARY

Embodiments may update the location model without increasing the load on the operator of the location detection system, or without deteriorating the position estimating accuracy.

According to one aspect of the present invention, a location model updating apparatus to update a location model based on data uploaded from a mobile terminal, includes a storage unit; and a processor configured to compute a certainty of data observed at a location having a location name designated by a user of the mobile terminal, based on a previous histogram stored in the storage unit, for each of most recent check-in data uploaded during a time from a previous histogram updating to a current histogram updating, and use the computed certainty as a number of votes to a histogram indicating a reception state of data from each base station at the location of the mobile terminal; generate a most recent histogram based on the number of votes to the histogram computed for each of the most recent check-in data; detect the location using the previous histogram, based on a received signal strength included in each of the most recent check-in data, in order to judge whether the check-in data is correct, depending on whether a location name of the detected location matches the location name designated by the user and included in each of the most recent check-in data; obtain a ratio of correct check-in data within each of the most recent check-in data, and compute a weight of the most recent histogram and a weight of the previous histogram from a ratio of correct check-in data currently obtained and a ratio of correct check-in data previously obtained; and update the previous histogram based on the weight of the most recent histogram and the weight of the previous histogram, in order to update the location model by storing the previous histogram that is updated, as the current histogram, in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of an all-region AP information list;

FIG. 5 is a diagram illustrating an example of a data structure of a location model;

FIGS. 12A, 12B, 12C, and 12D are diagrams illustrating examples of most recent histograms;

FIGS. 13A, 13B, 13C, and 13D are diagrams illustrating examples of the most recent histograms after normalization;

FIG. 14 is a diagram illustrating an example of location detection results with respect to each check-in data;

FIG. 19 is a diagram illustrating an example of the location detection results with respect to each check-in data;

DESCRIPTION OF EMBODIMENTS

Preferred embodiments of the present invention will be described with reference to the accompanying drawings.

A description will now be given of the location model updating apparatus, the position estimating method, and the computer-readable storage medium in each embodiment according to the present invention.

Figure 1:
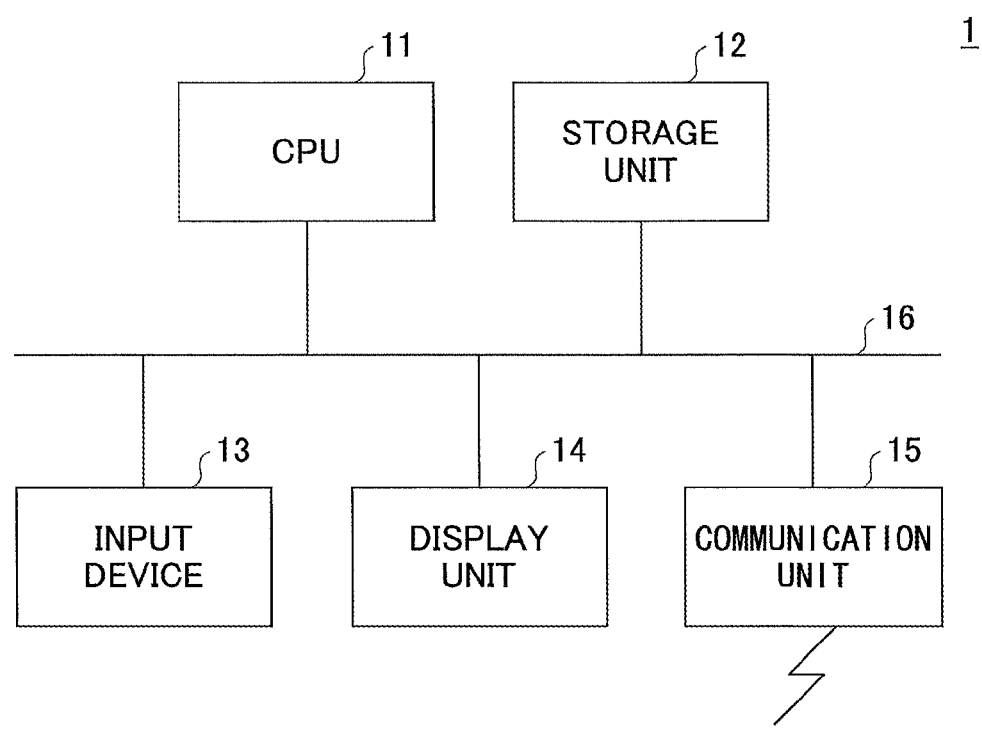
FIG. 1 is a block diagram illustrating an example of a configuration of a mobile terminal in one embodiment.

FIG. 1 is a block diagram illustrating an example of a configuration of a mobile terminal in one embodiment. A mobile terminal 1 illustrated in FIG. 1 is an example of a terminal apparatus provided with a communication function, which may be formed by a mobile phone such as a smart phone, for example. The mobile terminal 1 includes a CPU (Central Processing Unit) 11, a storage unit 12, an input device 13, a display unit 14, and a communication unit 15 that are connected via a bus 16. The mobile terminal 1 is not limited to the connection using the bus 16.

The CPU 11 is an example of a computer or processor. The CPU 11 controls the entire mobile terminal 1, and executes a position estimating process or the like to be described later, by executing one or more programs. The storage unit 12 stores one or more programs to be executed by the CPU 11, data to be used in computations performed by the CPU 11, or the like. The storage unit 12 may be formed by a non-transitory computer-readable storage medium. The non-transitory computer-readable storage medium may be formed by a semiconductor memory device. In a case in which the non-transitory computer-readable storage medium is formed by a recording medium such as a magnetic recording medium, an optical recording medium, a magneto-optical recording medium, or the like, the storage unit 12 may be formed by a reader and writer (or read and write unit) that reads information from and writes information to the recording medium that is loaded into the reader and writer.

The input device 13 may be formed by a keyboard or the like, and is operated by a user when inputting commands, data, or the like to the mobile terminal 1, for example. The display unit 14 may be formed by an LCD (Liquid Crystal Display) or the like, for example, and displays guidances, messages, or the like. The input device 13 and the display unit 14 may be formed integrally by a touchscreen panel, for example. The communication unit 15 has a wireless communication function capable of making wireless communication with an external apparatus (not illustrated), and has a known configuration including a receiver, a transmitter, an antenna, or the like. In this example, the communication unit 15 is communicable with an AP (Access Point) that uses WiFi, for example. The AP is an example of a base station.

Figure 2:
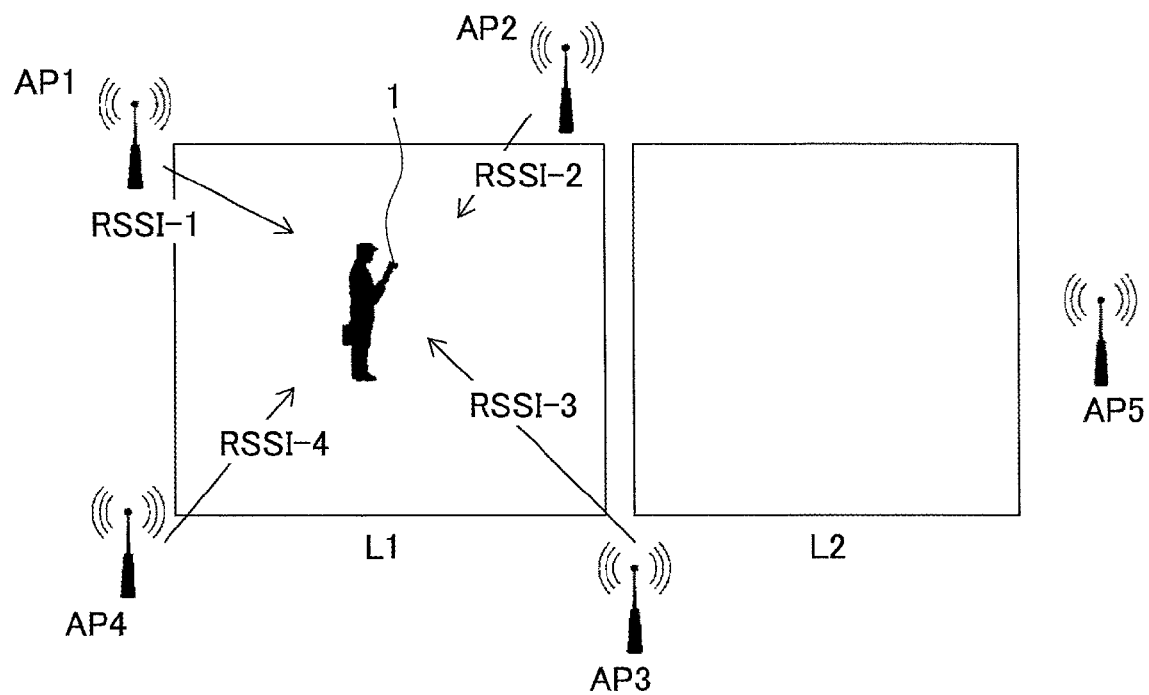
FIG. 2 is a diagram for explaining an example of a relationship of locations where a plurality of APs and a mobile terminal may exist.

FIG. 2 is a diagram for explaining an example of a relationship of locations where a plurality of APs and the mobile terminal may exist. In the example illustrated in FIG. 2, a plurality of APs, namely, APs AP1 through AP5, cover locations having location names L1 and L2, and the mobile terminal 1 carried by the user exists within the location having the location name L1. The RSSI at the mobile terminal 1 is RSSI-1 from the AP AP1, RSSI-1 from the AP AP2, RSSI-3 from the AP AP3, RSSI-4 from the AP AP4, and RSSI-5 from the AP AP5.

Figure 3:
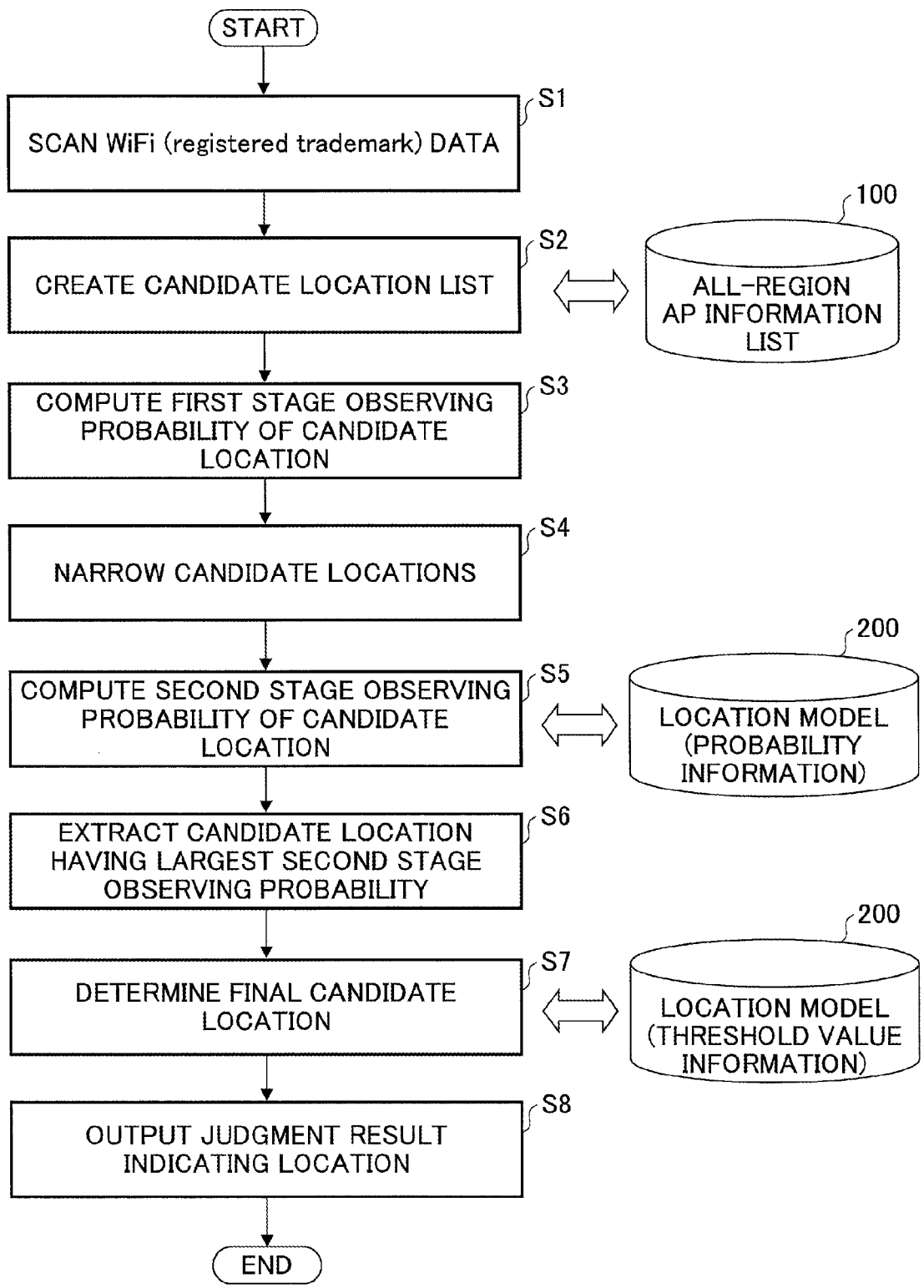
FIG. 3 is a flow chart for explaining an example of a position estimating process of the mobile terminal.

FIG. 3 is a flow chart for explaining an example of a position estimating process of the mobile terminal. The position estimating process illustrated in FIG. 3 may be executed by the CPU 11. In FIG. 3, the CPU 11 in step S1 scans WiFi data from each of the APs AP1 through AP5 to obtain WiFi scan data, acquires a MAC (Media Access Control) address of each of the APs AP1 through AP5 and the RSSIs from the WiFi scan data, and creates RSSI feature vectors. The CPU 11 in step S1 also refers to an all-region AP information list 100 stored in the storage unit 12, and excludes unlearned APs not included in the all-region AP information list 100.

FIG. 4 is a diagram illustrating an example of a data structure of the all-region AP information list. The all-region AP information list 100 illustrated in FIG. 4 includes, with respect to AP numbers 1, 2, . . . that are arbitrarily allocated to each of the APs, MAC addresses M1, M2, . . . of the APs, and an AP covering location list. The AP covering location list includes the location names L1, L2, L3, . . . of the locations.

As will be described below, the all-region AP information list 100 may be created based on the information acquired from the WiFi scan data. First, a blank all-region AP information list 100 is prepared. Thereafter, when the all-region AP information list 100 is searched and a check-in AP at a source of the WiFi scan data is new, the MAC address of the check-in AP is added to the all-region AP information list 100. At the same time, the location name that is checked in is added to a covering location list of this check-in AP. In a case in which the check-in AP is already stored in the all-region AP information list 100, the covering location list of this check-in AP is searched, and a check-in location name is added to the covering location list when the check-in location name is new.

In FIG. 3, the CPU 11 in step S2 refers to the all-region AP information list 100 to create a candidate location list of all coverage locations of the searched APs, as candidate locations, and stores the created candidate location list in the storage unit 12. The CPU 11 in step S2 also executes the following processes with respect to each AP APi. First, the CPU 11 performs a process to extract a coverage location list of each AP APi by referring to the all-region AP information list 100. Next, the CPU 11 performs a process to add all members (that is, all locations) of the coverage location list of each AP APi to the candidate location list, but this process is skipped when the member (that is, location) is already added to the candidate location list. Next, the CPU 11 makes a judgment to determine whether the process with respect to all APs APi is completed. When the judgment result is NO, the process of the CPU 11 returns to the process to extract the coverage location list, and the process advances to step S3 illustrated in FIG. 3 when the judgment result is YES.

In FIG. 3, the CPU 11 in step S3 computes a first stage observing probability of the AP that is the source of the WiFi scan data, with respect to each member (that is, each location) of the candidate location list. FIG. 5 is a diagram illustrating an example of a data structure of a location model. A location model 200 illustrated in FIG. 5 includes a location number, a location name, a threshold value of a second stage observing probability to be used within the location, and an observable AP list. The observable AP list includes a missing probability, observing probability, an observing probability for each strength level of the RSSI for a case in which the AP is observed, or the like, with respect to the MAC address. FIG. 5 illustrates a case in which the number of strength levels of the RSSI for the case in which the AP is observed is four (4), and a length of the observable AP list is three (3), for example. The location model 200 is stored in the storage unit 12, for example. Because the observable AP list includes a probability information part of the location model 200, the observable AP list in FIG. 3 is illustrated as a "location model (probability information)". On the other hand, because parts other than the observable AP list includes a threshold value information part of the second stage observing probability to be used at each location of the location model 200, the parts other than the observable AP list in FIG. 3 is illustrated as a "location model (threshold value information)".

The CPU 11 in step S3 performs the following processes for each AP APi, with respect to each candidate location. First, the CPU 11 searches the observable AP list of the candidate location in the location model 200 illustrated in FIG. 5, and acquires an observing probability that is learned in advance when the AP APi is included in the observable AP list. On the other hand, when the AP APi is not included in the observable AP list, the CPU 11 sets a relatively small constant that is set in advance, for example, as the observing probability of the AP APi. Next, the CPU 11 accumulates the observing probability of the AP APi to a product of the observing probability stored in the storage unit 12, and the CPU 11 makes a judgment to determine whether the process with respect to all APs APi is completed. When the judgment result is NO, the process of the CPU 11 returns to the process with respect to each AP APi, and when the judgment result is YES, the CPU 11 extracts the observable AP list of the candidate location of the location model 200 illustrated in FIG. 5.

Next, the CPU 11 performs the following processes with respect to each observable AP. First, the CPU 11 searches the WiFi scan data (AP1 (MAC, RSSI, . . . )) to judge whether the observable AP is missing. When the MAC address of the observable AP is not included in the WiFi scan data, the CPU 11 judges that there is no missing observable AP, and the CPU 11 repeats the judgment to determine whether the observable AP is missing. On the other hand, when the CPU 11 judges that there is a missing observable AP, the CPU 11 extracts the missing probability of the missing observable AP from the location model 200, and the CPU 11 accumulates the missing probability to a product of the missing probability stored in the storage unit 12. When the process with respect to all observable APs is completed, the CPU 11 computes a product of the product of the observing probability and the product of the missing probability stored in the storage unit 12. The CPU 11 defines the computed product as the first stage observing probability of the candidate location, and the computed product is paired with the candidate location by the CPU 11 and stored in the storage unit 12. When the process with respect to all candidate locations is completed, the process of the CPU 11 advances to step S4 illustrated in FIG. 3.

In FIG. 3, the CPU 11 in step S4 discards the candidate locations having a low or low order first stage observing probability, in order to narrow the candidate locations. The CPU 11 in step S5 computes the second stage observing probability based on the RSSI feature vector, with respect to the narrowed candidate locations. A second stage observing probability computing process performs the computation with respect to the candidate location list that is narrowed in step S4 by the first stage observing probability computed in step S3.

The CPU 11 in step S5 performs the following processes for each AP APi, with respect to each candidate location. First, the CPU 11 refers to the location model 200, and when the MAC address of the AP APi is included in the observable AP list of the candidate location, the CPU 11 computes the strength level from the RSSI of the AP APi, and acquires from the location model 200 the observing probability for each strength level of the RSSI for the case in which the AP APi is observed. On the other hand, when the MAC address of the AP APi is not included in the observable AP list of the candidate location, the CPU 11 sets a relatively small constant that is set in advance, for example, as the observing probability for each strength level of the RSSI for the case in which the AP APi is observed. Next, the CPU 11 accumulates the observing probability for each strength level of the RSSI for the case in which the AP APi is observed to a product of the observing probability for each strength level stored in the storage unit 12, and the CPU 11 makes a judgment to determine whether the process with respect to all APs APi is completed. When the judgment result is NO, the process of the CPU 11 returns to the process with respect to each AP APi, and when the judgment result is YES, the CPU 11 computes a product of the product of the missing probability computed in step S3 and the product of the observing probability for each strength level, to store the computed product in the storage unit 12. Then, the CPU 11 defines the computed product as the second stage observing probability, and the computed product is paired with the candidate location by the CPU 11 and stored in the storage unit 12. When the process with respect to all candidate locations is completed, the process of the CPU 11 advances to step S6 illustrated in FIG. 3.

In FIG. 3, the CPU 11 in step S6 extracts (or selects) the candidate location having the largest second stage observing probability. The CPU 11 in step S7 refers to the location model 200 illustrated in FIG. 5, and determines a final candidate location by making a judgment using a threshold value of the candidate location having the largest second stage observing probability. When the second stage observing probability is less than the threshold value, the CPU 11 judges that the mobile terminal 1 is not located at a final candidate location and the location of the mobile terminal 1 is unknown.

On the other hand, when the second stage observing probability is greater than or equal to the threshold value, the CPU 11 judges that the mobile terminal 1 is located at the final candidate location. The CPU 11 in step S8 outputs a judgment result indicating the location of the mobile terminal 1, or indicating that the location of the mobile terminal 1 is unknown, and the position estimating process ends. The judgment result output in step S8 may be output to application software or the like that provides services utilizing the position of the mobile terminal 1, for example.

By executing the processes of steps S1 through S5 corresponding to procedures of the position estimating method, the CPU 11 may function as a narrowing unit or means to narrow the candidate positions of the mobile terminal that are estimated from the signals received from the plurality of base stations, based on the missing data of the signal received from a certain base station. In addition, by executing the processes of steps S6 and S7 corresponding to procedures of the position estimating method, the CPU 11 may function as an estimating unit or means to estimate the position of the mobile terminal from the narrowed candidate positions, based on the observing probability of the strength of the signals received.

Figure 6:
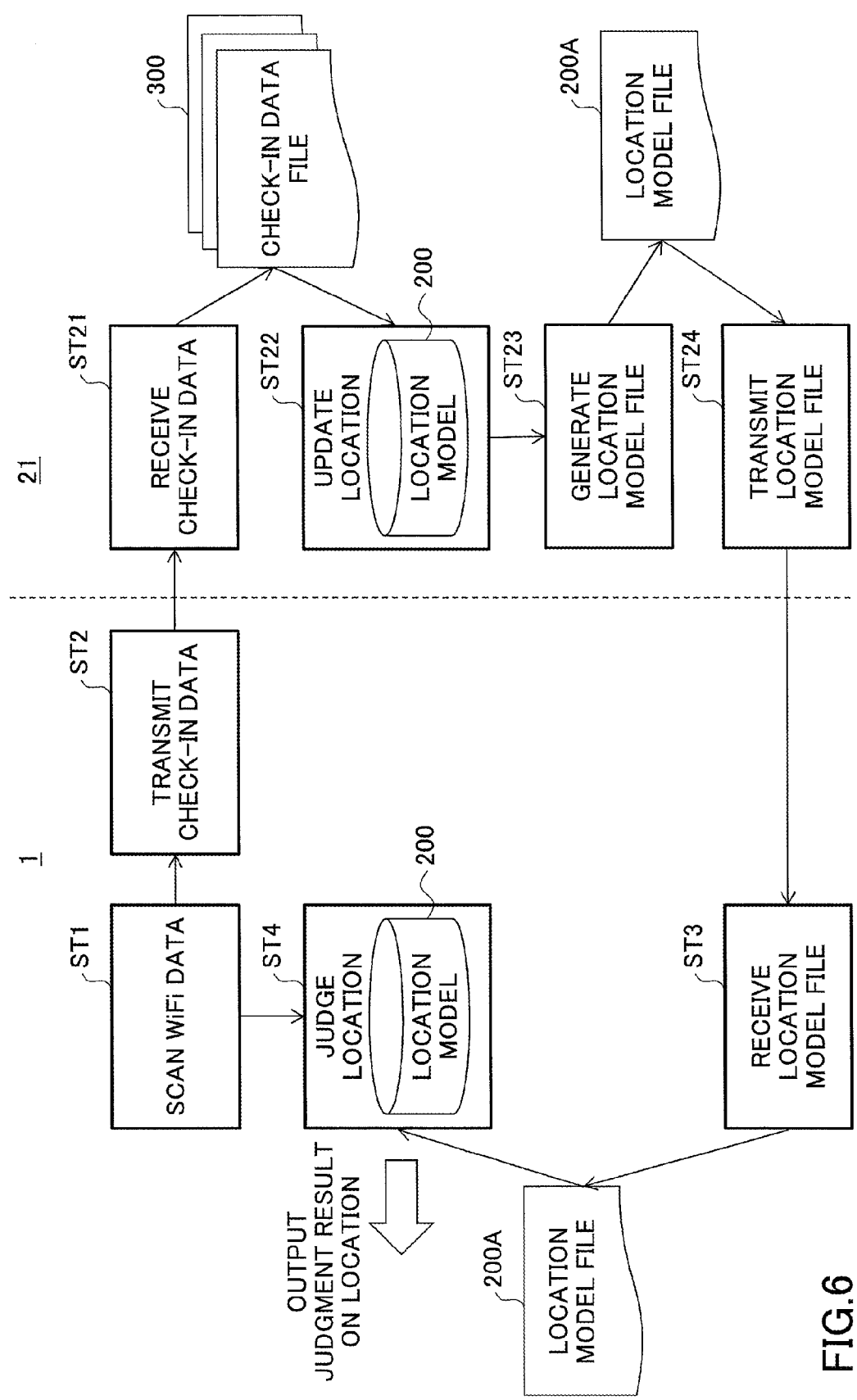
FIG. 6 is a diagram for explaining an example of an operation of a position estimating system in one embodiment.

Next, a description will be given of an example of a position estimating system in one embodiment, by referring to FIG. 6. FIG. 6 is a diagram for explaining an example of an operation of the position estimating system in one embodiment. A position estimating system 20 illustrated in FIG. 6 includes a mobile terminal 1, and a server 21 communicable with the mobile terminal 1 by wireless communication. The server 21 has a function to learn (hereinafter also referred to as "update") the location model 200, using data (hereinafter also referred to as "check-in data") checked in from the mobile terminal 1. The mobile terminal 1 performs the position estimating process based on RSSI feature vectors that are newly observed, using the location model 200 downloaded from the server 21. The server 21 has a known configuration including a processor and a storage unit, and may have a hardware configuration similar to that of the mobile terminal 1 illustrated in FIG. 1, for example. For this reason, illustration and description of the hardware configuration of the server 21 will be omitted. In this example, the server 21 functions as an example of a location data updating apparatus.

In step ST1 illustrated in FIG. 6, the processor (for example, CPU 11) of the mobile terminal 1 acquires the check-in data by acquiring the MAC address and the RSSI of each AP from the WiFi scan data. In step ST2, the processor of the mobile terminal 1 transmits the check-in data to the server 21.

In step ST21, the processor (corresponding to CPU 11 illustrated in FIG. 1, for example) of the server 21 receives the check-in data from the mobile terminal 1, and stores the check-in data in a check-in data file 300 within the storage unit (corresponding to the storage unit 12 illustrated in FIG. 1, for example) of the server 21. In step ST22, the processor of the server 21 reads the check-in data file 300 from the storage unit of the server 21, and executes the updating process to update the location model 200.

The updating process to update the location model 200 may include updating the probability information part of the location model 200, updating the threshold value information part of the location model, or the like. Updating the probability information part updates the location model (probability information) corresponding to the probability information part of the location model 200, using the check-in data. Thereafter, when computing the second stage observing probability, the process of a second stage of the location estimation is performed with respect to the check-in data, based on the location model (probability information). The second stage observing probability and the location name of the check-in location, obtained by the process of the second stage of the location estimation, are used to compute the threshold value of the second stage observing probability, that is, the threshold value at each check-in location, in order to update the location model (threshold value information) corresponding to the threshold value information part of the location model 200. The update process to update the location model 200 is completed after the probability information part and the threshold value information part of the location model 200 are updated.

In step ST23, the processor of the server 21 generates a file (hereinafter also referred to as a "location model file") 200A of the updated location model 200, and stores the location model file 200A in the storage unit of the server 21. In step ST24, the processor of the server 21 reads the location model file 200A from the storage unit of the server 21, and transmits the location model file 200A to the mobile terminal 1.

In step ST3, the process of the mobile terminal 1 receives the location model file 200A from the server 21, and stores the location model file 200A in the storage unit 12 of the mobile terminal 1. In other words, the mobile terminal 1 stores the location model file 200A in the storage unit 12 and updates the location model 200 every time a new location model file 200A is generated in the server 21. In step ST4, the processor of the mobile terminal 1 reads the location model file 200A from the storage unit 12, to perform the position estimating process based on the RSSI feature vectors of the check-in data, using the location model 200, and outputs a judgment result on the location of the mobile terminal 1.

Figure 7:
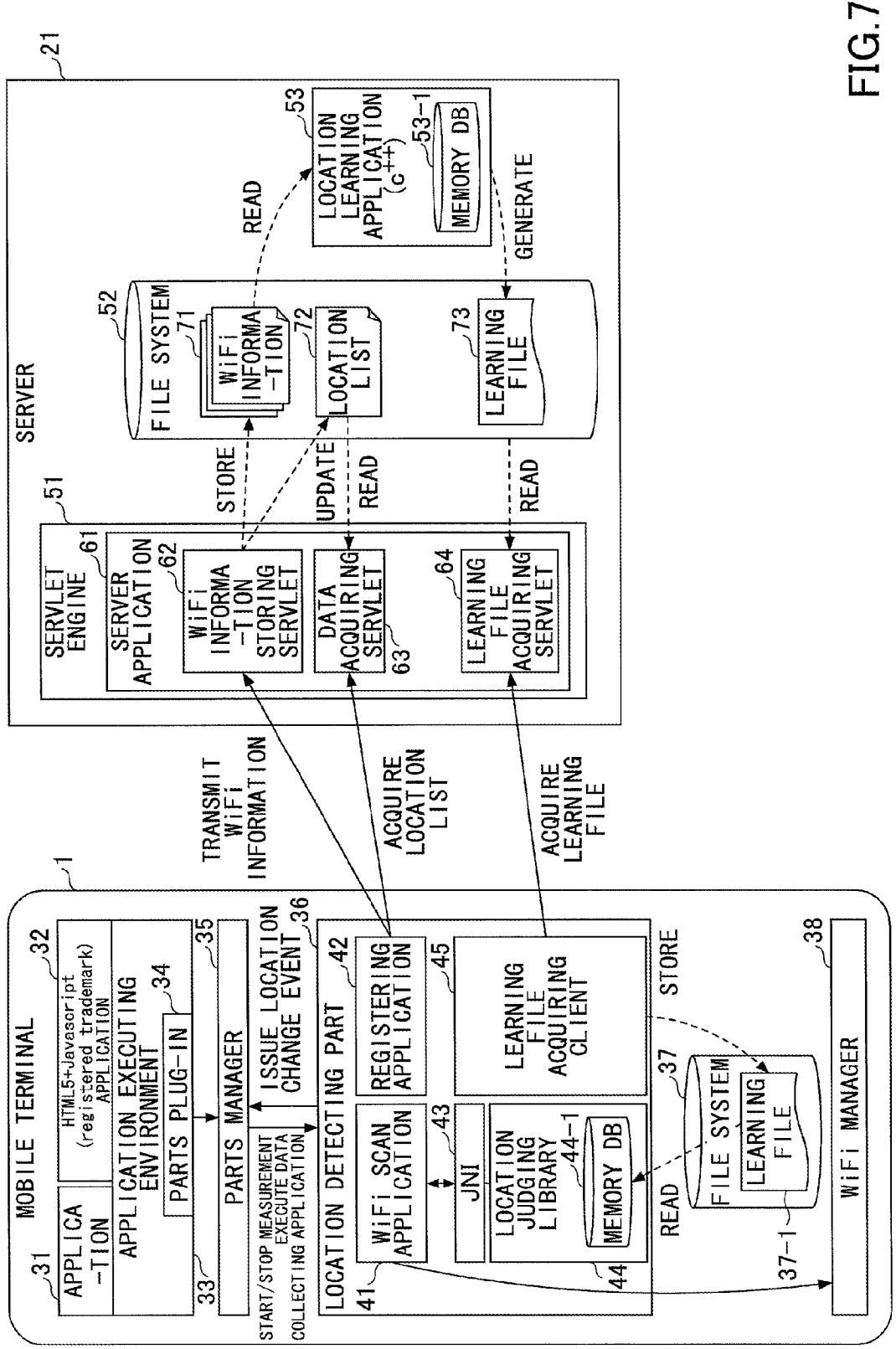
FIG. 7 is a diagram illustrating an example of a software configuration of the position estimating system.

FIG. 7 is a diagram illustrating an example of a software configuration of the position estimating system. In FIG. 7, the mobile terminal 1 includes control application software (hereinafter also simply referred to as "application") 31, HTML5+Javascript (registered trademark) application 32, an application executing environment 33, a parts plug-in 34, a parts manager 35, a location detecting part 36 which is an example of a location detecting function, a file system 37 including a learning file 37-1, and a WiFi manager 38. The location detecting part 36 includes WiFi scan application 41, registering application 42 to register WiFi data collecting location name, a JNI (Java Native Interface) 43, a location judging library 44 including a memory DB (Data-Base) 43-1, and a learning file acquiring client 45. Instructions such as start measurement, stop measurement, execute data collecting application, or the like, for example, are issued from the parts manager 35 and input to the location detecting part 36. In addition, a location change event, for example, is issued from the location detecting part 36 and input to the parts manager 35.

On the other hand, the server 21 includes a servlet engine 51, such as Tomcat (registered trademark), for example, a file system 52, and location learning application 53 including a memory DB 53-1. The servlet engine 51 includes server application 61 to collect WiFi data. The server application 61 includes a WiFi information storing servlet 62, a data acquiring servlet 63, and a learning file acquiring servlet 64. The file system 52 includes WiFi information 71, a location list 72, and a learning file 73.

In this example, the application of the mobile terminal 1 that is carried by a user is controlled in response to an entry or exit event of the user with respect to a location. The location detecting part 36 of the mobile terminal 1 detects the entry or exit event of the user with respect to the location, and notifies the detected entry or exit event to the application executing environment 33 via the parts manager 35 and the parts plug-in 34. The application executing environment 33 has a function to have an application, that is to be used only at the location where the user checked in, pushed from the server 21 to the mobile terminal 1, and to have an application deleted when the user checks out.

WiFi sample data required to create the location model may be collected in the following manner. The location detecting part 36 requires the location model in order to detect the entry or exit of the user with respect to the location. The location model is created based on WiFi information including the MAC address and the RSSI of the WiFi data observed at the location. In this example, in order to make the collecting of the WiFi sample data for creating the location model as simple as possible, an operator of the location detecting system first collects the WiFi sample data in advance at all locations that need to be detected, and creates an initial location model. Thereafter, the initial location model is loaded into the mobile terminal 1 of each user, so that an operation may be started using the initial location model.

When the user enters a location, the location detecting part 36 detects the location and issues an entry event with respect to the application. More particularly, the WiFi scan application 41, under management of the WiFi manager 38, acquires the WiFi information including the MAC address and the RSSI of the WiFi data observed at the location, and creates the RSSI feature vectors. In addition, the WiFi scan application 41 refers to the all-region AP information list stored in the memory DB 44-1 of the location judging library 44, via the JNI 43, in order to estimate the current location. The JNI 43 forms an interface linking programs written in Java, and codes to be actually executed on the CPU 11, which are written in C++ language, for example. The all-region AP information list can be read into the memory DB 44-1 of the location judging library 44, from the location model included in the learning file 37-1 of the file system 37.

The application executing environment 33 controls the application according to the entry event. For example, in a case in which an erroneous location is detected, the user may start the registering application 42 to register WiFi data collecting location name, in order to register the correct location. The registering application 42 displays candidate locations on the display unit 14, for example, and urges the user to select a candidate location or to newly input the candidate location from the input device 13. When the candidate location is selected or newly input, the WiFi information of the location acquired by the scan of the WiFi scan application 41 is uploaded to the server 21 by wireless communication. Data of the paired MAC address and the RSSI of the WiFi information, linked to the location name uploaded to the server 21, are the "check-in data". The registering application 42 can acquire the location list from the server 21. In addition, the learning file acquiring client 45 can acquire the learning file from the server 21, and store the acquired learning file in the file system 37 as the learning file 37-1.

When the position estimating system illustrated in FIG. 7 is used by a large number of users, a large number of check-in data is uploaded, every day, to the server 21 from one or more mobile terminals 1. At the server 21, the WiFi information storing servlet 62 of the server application 61 stores the WiFi information into the file system 52 as the WiFi information 71. The WiFi information can be read into the memory DB 53-1 by the location learning application 53. In addition, the data acquiring servlet 63 of the server application 61 acquires the location list 72 of the file system 52 that is updatable by the WiFi information storing servlet 62. The location learning application 53 periodically updates and stores into the memory DB 53-1 the location models for all of the registered locations, using the check-in data stored in the memory DB 53-1 as learning samples. The learning file generated from the location model stored in the memory DB 53-1 of the location learning application 53 is stored in the file system 52 as the learning file 73. This learning file 73 can be read by the learning file acquiring servlet 64 of the server application 61.

At the learning stage of the server 21, an observing frequency of the RSSI of each AP, and a missing frequency of each AP, are counted from the check-in data collected by the mobile terminal 1 at each location. After the counting is completed, the counted frequencies at each location are normalized by dividing the counted frequencies by the number of check-in data at each location, in order to obtain the RSSI observing probability at each location and the missing probability of the observable AP, which are stored in the location model. At the location detecting stage, a likelihood is computed for all registered location candidates using the probability method, based on the observed WiFi information and the location model. The computed likelihood of the location candidate is defined as a "location likelihood (or likelihood of location)", and the location candidate having a maximum location likelihood that is greater than or equal to a threshold value is judged to be the "location" where the user is currently located. Accordingly, the location model stores probability distribution information, including the observing and missing probability distributions of each AP at each location, and an observing probability distribution of the RSSI level of each AP at each location.

Figure 8:
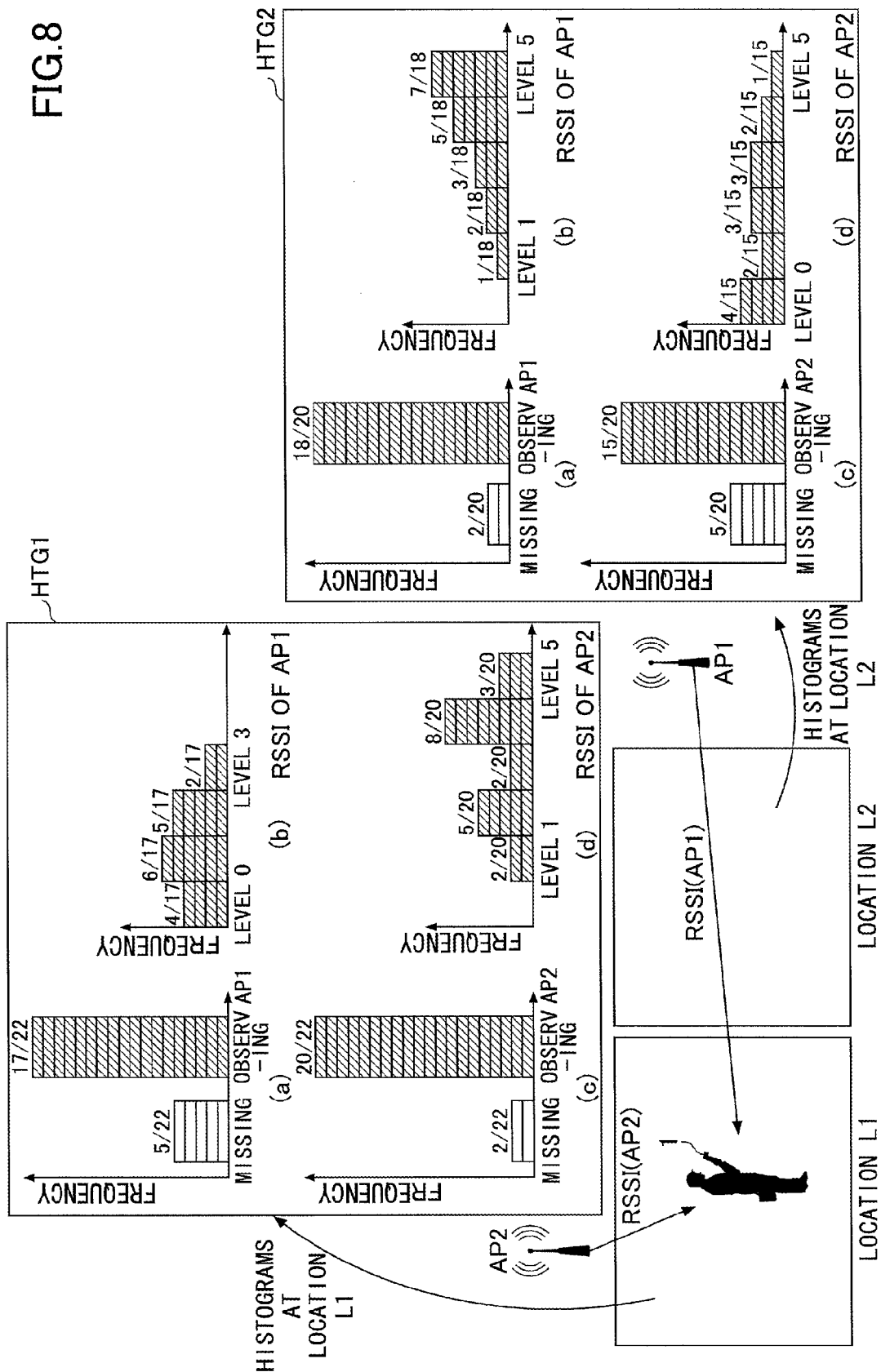
FIG. 8 is a diagram for explaining an example of the location model.

FIG. 8 is a diagram for explaining an example of the location model. FIG. 8 illustrates the AP observing and missing probabilities, and the observing probability for each RSSI level. In HTG1 of FIG. 8, (a) illustrates missing and observing histograms for an example in which, amongst 22 learning samples (check-in data) collected at a location having a location name L1, 5 samples are the samples missing observation of the AP AP1, and 17 samples are the samples of observation of the AP AP1. In this case, at the location having the location name L1, the missing probability of the AP AP1 is 5/22=0.227, and the observing probability of the AP AP1 is 17/22=0.773. In addition, in HTG1 of FIG. 8, (b) illustrates an RSSI histogram in which, amongst 17 samples of the AP AP1 observed, 4 samples have the RSSI level 0, 6 samples have the RSSI level 1, 5 samples have the RSSI level 2, and 2 samples have the RSSI level 3. Accordingly, when the AP AP1 is observed at the location having the location name L1, the observing probability for the RSSI levels 0, 1, 2, and 3 are 4/17=0.235, 6/17=0.353, 5/17=0.294, and 2/17=0.118, respectively. Similarly, in HTG1 of FIG. 8, (c) illustrates missing and observing histograms for an example in which, at the location having the location name L1, the missing probability of the AP AP2 is 2/22=0.091, and the observing probability of the AP AP2 is 20/22=0.909. Further, in HTG1 of FIG. 8, (d) illustrates an RSSI histogram in which, when the AP AP2 is observed at the location having the location name L1, the observing probability for the RSSI levels 1, 2, 3, 4, and 5 are 2/20=0.100, 5/20=0.250, 2/20=0.100, 8/20=0.400, and 3/20=0.150, respectively.

In HTG2 of FIG. 8, (a) illustrates missing and observing histograms for an example in which, amongst 20 learning samples (check-in data) collected at a location having a location name L2, 2 samples are the samples missing observation of the AP AP1, and 18 samples are the samples of observation of the AP AP1. In this case, at the location having the location name L2, the missing probability of the AP AP1 is 2/20=0.100, and the observing probability of the AP AP1 is 18/20=0.900. In addition, in HTG2 of FIG. 8, (b) illustrates an RSSI histogram in which, amongst 18 samples of the AP AP1 observed, 1 sample has the RSSI level 1, 2 samples have the RSSI level 2, 3 samples have the RSSI level 3, 5 samples have the RSSI level 4, and 7 samples have the RSSI level 5. Similarly, in HTG2 of FIG. 8, (c) illustrates missing and observing histograms for an example in which, at the location having the location name L2, the missing probability of the AP AP2 is 5/20=0.250, and the observing probability of the AP AP2 is 15/20=0.750. Further, in HTG2 of FIG. 8, (d) illustrates an RSSI histogram in which, when the AP AP2 is observed at the location having the location name L2, the observing probability for the RSSI levels 0, 1, 2, 3, 4, and 5 are 4/15=0.267, 2/15=0.133, 3/15=0.200, 3/15=0.200, 2/15=0.133, and 1/15=0.067, respectively.

In HTG1 and HTG2 of FIG. 8, the ordinates in (a) and (c) indicate the missing frequency and the observing frequency of the data observation, and the abscissas in (a) and (c) indicate the observation missing state or the observing state of the APs AP1 and AP2, respectively. In addition, in HTG1 and HTG2 of FIG. 8, the ordinates in (b) and (d) indicate the observing frequency, and the abscissas in (b) and (d) indicate the RSSI level of the APs AP1 and AP2, respectively.

The likelihood of the candidate position can be computed from [Likelihood]=[Probability of Observing RSSI Level]×[Probability of Missing Observation of AP]. For example, in a case in which the RSSI obtained by scanning the AP AP1 has the RSSI level 1, the likelihood of the location having the location name L1 is [Probability of Observing RSSI Level 1 of AP AP1]×[Probability of Missing observation of AP AP2]=[6/17]×[2/22]=0.032. In addition, in a case in which the RSSI obtained by scanning the AP AP1 has the RSSI level 1 and the RSSI obtained by scanning the AP AP2 has the RSSI level 4, for example, the likelihood of the location having the location name L1 can be computed from [Probability of Observing RSSI Level 1 of AP AP1]×[Probability of Observing RSSI level 4 of AP AP2]=[6/17]×[8/20]=0.141.

In order to improve the position estimating accuracy, the location preferably learns from a large number of learning samples. However, in order to collect a large number of learning samples, the operator of the location detecting system must move to all target locations to collect the RSSI samples, Hence, the larger the number of locations, the larger the load on the operator to collect the RSSI samples. In order to reduce the load on the operator, it may be conceivable to create an initial location model based on the RSSI samples collected at a predetermined number of locations, and to update the initial location model based on the samples from the mobile terminal at the time of updating the location morel or during the operation to detect the location, so as to improve the position estimating accuracy. However, according to this conceivable method, the samples from the mobile terminal, used to update the initial location model, are based on inputs made from the user of the mobile terminal, and the reliability of the samples is unknown. For example, when the user inputs data, such as an erroneous location name, from the mobile terminal the initial location model is updated based on erroneous data. In addition, when the initial location model is updated based on the erroneous data, the position estimating accuracy deteriorates.

Accordingly, in one embodiment, in order to reduce the effects of erroneous check-in data, the location model that has learned is automatically updated based solely on most recent (or newest) check-in data. More particularly, a most recent histogram is first generated by a histogram generating process using the most recent check-in data. Then, during a histogram updating process, the most recent histogram and a previous histogram are weighted and combined, to generate a current histogram. The current histogram becomes the previous histogram during the next histogram updating process. As will be explained below, the histogram updating process reduces the effects of the erroneous check-in data in two stages.

Figure 9:
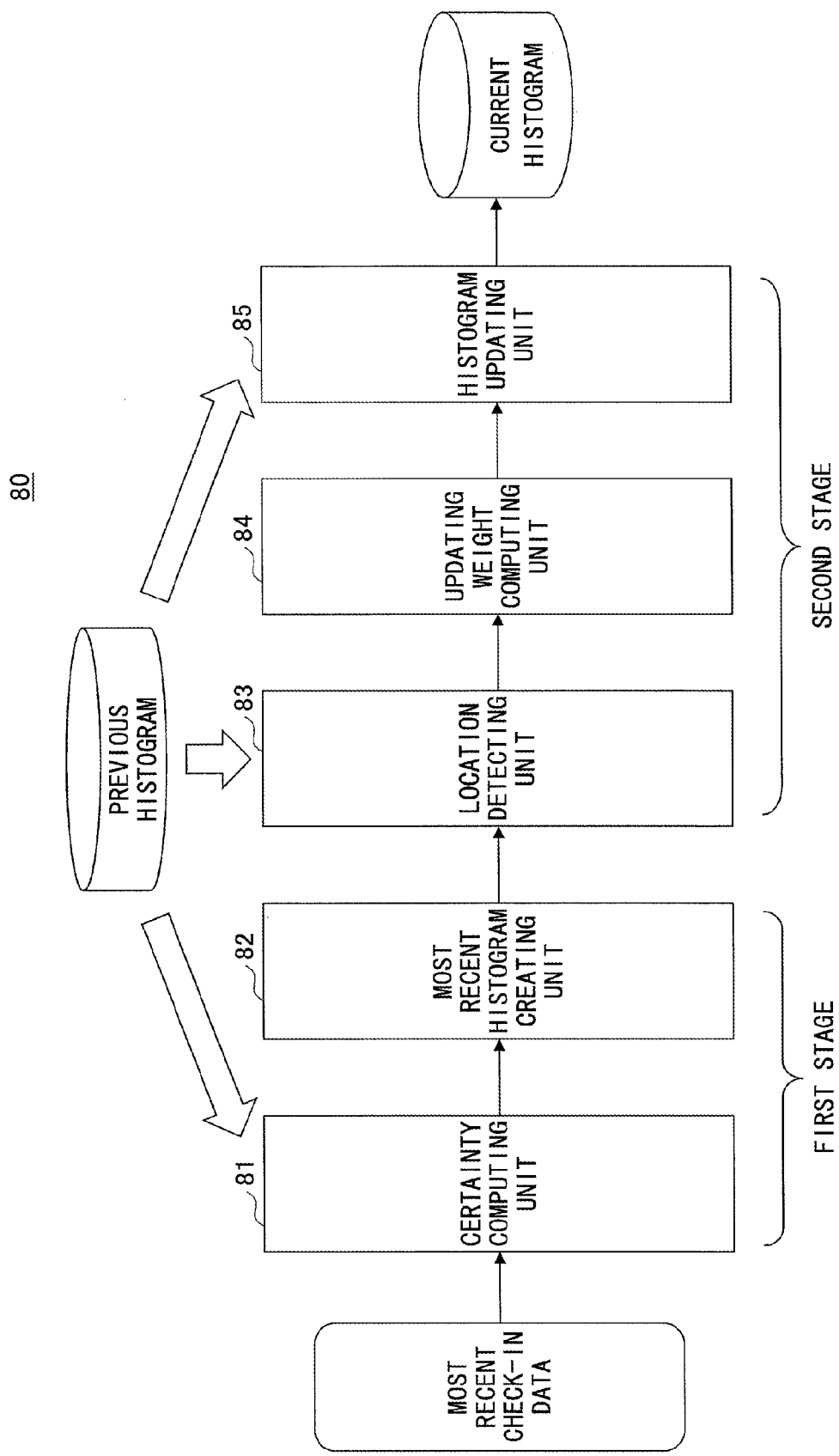
FIG. 9 is a block diagram illustrating an example of a location model updating apparatus in one embodiment.

FIG. 9 is a block diagram illustrating an example of a location model updating apparatus in one embodiment. A location model updating apparatus 80 illustrated in FIG. 9 includes a certainty computing unit 81, a most recent histogram creating unit 82, a location detecting unit 83, an updating weight computing unit 84, and a histogram updating unit 85. The certainty computing unit 81 and the most recent histogram creating unit 82 execute processes of the first stage to be described later. On the other hand, the location detecting unit 83, the updating weight computing unit 84, and the histogram updating unit 85 execute processes of the second stage to be described later. Functions of the location model updating apparatus 80 may be executed by the processor of the server 21, for example, and may execute processes corresponding to the processes of steps ST22 and ST23 illustrated in FIG. 6, for example.

At the first stage, the most recent histogram is generated in the following manner. The certainty computing unit 81 computes a certainty of data observed at the location having the location name designated by the user, based on the previous histogram stored in the storage unit of the server 21, for each most recent check-in data, and sets the certainty that is computed as a number of votes (or a score) added to the histogram. In addition, the most recent histogram creating unit 82 generates the most recent histogram, based on the certainty computed for each most recent check-in data, that is, based on the number of votes (o score) added to the histogram. The most recent check-in data refers to the check-in data uploaded to the server 21 during a time from the previous histogram updating to the current histogram updating.

The number of votes of the check-in data may be computed in the following manner, for example. The check-in data $d_i$ is represented by $$d_i = \{S_i; l_i^{user}\}; i=0,\ldots,I,$$

and the WiFi scan data $s_i$ is represented by $$s_i = [r(\alpha_0), r(\alpha_1), \ldots, r(\alpha_k), \ldots, r(\alpha_K)]$$

where i denotes an index of the check-in data, I denotes a number of all check-in data, $\alpha_k$ denotes a MAC address of the access point (AP), $r(\alpha_k)$ is an integer value denoting the RSSI at the access point $\alpha_k$, K denotes a number of access points observed by the scan, $l_i^{user}$ denotes a location name linked by the user to the WiFi scan data $s_i$. In the following $M_{old}$ denotes the previous histogram, and $M_{new}$ denotes the most recent histogram.

With respect to the check-in data $d_i = \{S_i; l_i^{user}\}$, a location likelihood $q(l_i^{user}|s_i; M_{old})$ of the location $l_i^{user}$ linked by the user is computed based on the previous histogram $M_{old}$. In addition, location likelihood $q(l_i^{user}|s_i; M_{old})$ is used as the number of votes when generating a weighted histogram. In other words, the number of votes, $w_i$, of the check-in data $d_i$ is represented by the following formula (1).

$$w_i = q(l_i^{user}|s_i; M_{old}) \tag{1}$$

The number of votes, $w_i$, can be paired with the check-in data $d_i$ and represented as $\{d_i; w_i\}$.

The most recent histogram $M_{new}$ may be generated in the following manner, for example. In this example, a description will be given of the generation of the most recent histogram $M_{new}$ of the access point $\alpha$ at the location l. A number of check-in data at the location l is denoted by $N(l)$, and an index of the check-in data at the location l is denoted by n. A frequency $b_{new}(r)$ of observing the RSSI level r of the access point α at the location l may be counted and normalized by the number of data, as represented by the following formula (2)

$$b_{new}(r) = \frac{1}{N(l)} \sum_{n=0}^{N(l)} X_n \quad (2)$$

where the following formula (3) stands.

$$X_n = \begin{cases} w_n & \text{if } [r(a)]_n = r \\ 0 & \text{other} \end{cases} \quad (3)$$

In addition, $[r(\alpha)]_n$ denotes the RSSI of the access point α observed by the nth check-in data. Normally, when computing the votes (or score) of the histogram, it is assumed that $w_i=1$, however, $w_n \in [0.0\ 1.0]$ in this example.

At the second stage, the histogram is updated in the following manner. The location detecting unit 83 performs the location detection using the previous histogram, based on the RSSI data included in each most recent check-in data, and judges whether the check-in data is correct depending on whether the detected location name matches the location name that is designated by the user and is included in each most recent check-in data. The updating weight computing unit 84 obtains a ratio of the correct check-in data within each most recent check-in data, and computes a weight of the most recent histogram and a weight of the previous histogram from the currently obtained ratio of the correct check-in data and the previously obtained ratio of the correct check-in data, respectively. The weights that are computed may be the ratios themselves that are obtained. The histogram updating unit 85 updates the previous histogram based on an weighted average of the most recent histogram and a weighted average of the previous histogram, and stores the previous histogram that is updated into the storage unit of the server 21 as the current histogram, in order to update the location model stored in the storage unit of the server 21.

The weight of the histogram may be computed in the following manner, for example. The location detecting process represented by the following formula (4) may be performed on the WiFi scan data $s_i$ of all check-in data $d_i = \{S_i; 1_i^{user}\}$, based on the previous histogram $M_{old}$, where $\hat{1}_i$ denotes a detected location that is detected from the location model used up to that point in time.

$$\hat{1}_i = G(s_i, M_{old}) \quad (4)$$

Amongst the check-in data at the location l, the data whose detected location $\hat{1}$ matches the location name $1_i^{user}$ assigned by the user is counted as teaching data, as represented by the following formula (5), where the formula (6) stands.

$$N_{corr}(l) = \sum_{n=0}^{N(l)} \delta_{l_n^{user}, \hat{l}_n} \quad (5)$$

$$\delta_{l_n^{user}, \hat{l}_n} = \begin{cases} 1 & l_n^{user} = \hat{l}_n \\ 0 & l_n^{user} \neq \hat{l}_n \end{cases} \quad (6)$$

A ratio $\lambda_{new}$ of the teaching data occupying the check-in data at the location l may be computed based on the following formula (7).

$$\lambda_{new} = N_{corr}(l)/N(l) \quad (7)$$

The location model may also be updated in the following manner, for example. That is, a frequency b(r) at which the RSSI level r of the access point α is observed at the location l may be updated according to the following formula (8), where $\lambda_{old}$ denotes a ratio of the teaching data occupying the check-in data up to that point in time, and η is represented by the following formula (9).

$$b(r) = \{\lambda_{old}/(\lambda_{new} + \lambda_{old})\} b_{old}(r) + \eta = \lambda_{new}/(\lambda_{new} + \lambda_{old})$$
$$b_{new}(r) \quad (8)$$

$$\eta = \lambda_{new}/(\lambda_{old} + \lambda_{new}) \quad (9)$$

Finally, the updated frequency b(r) is substituted into $b_{old}(r)$, as represented by the following formula $$b_{old}(r) = b(r) \quad (10)$$

Figure 10:
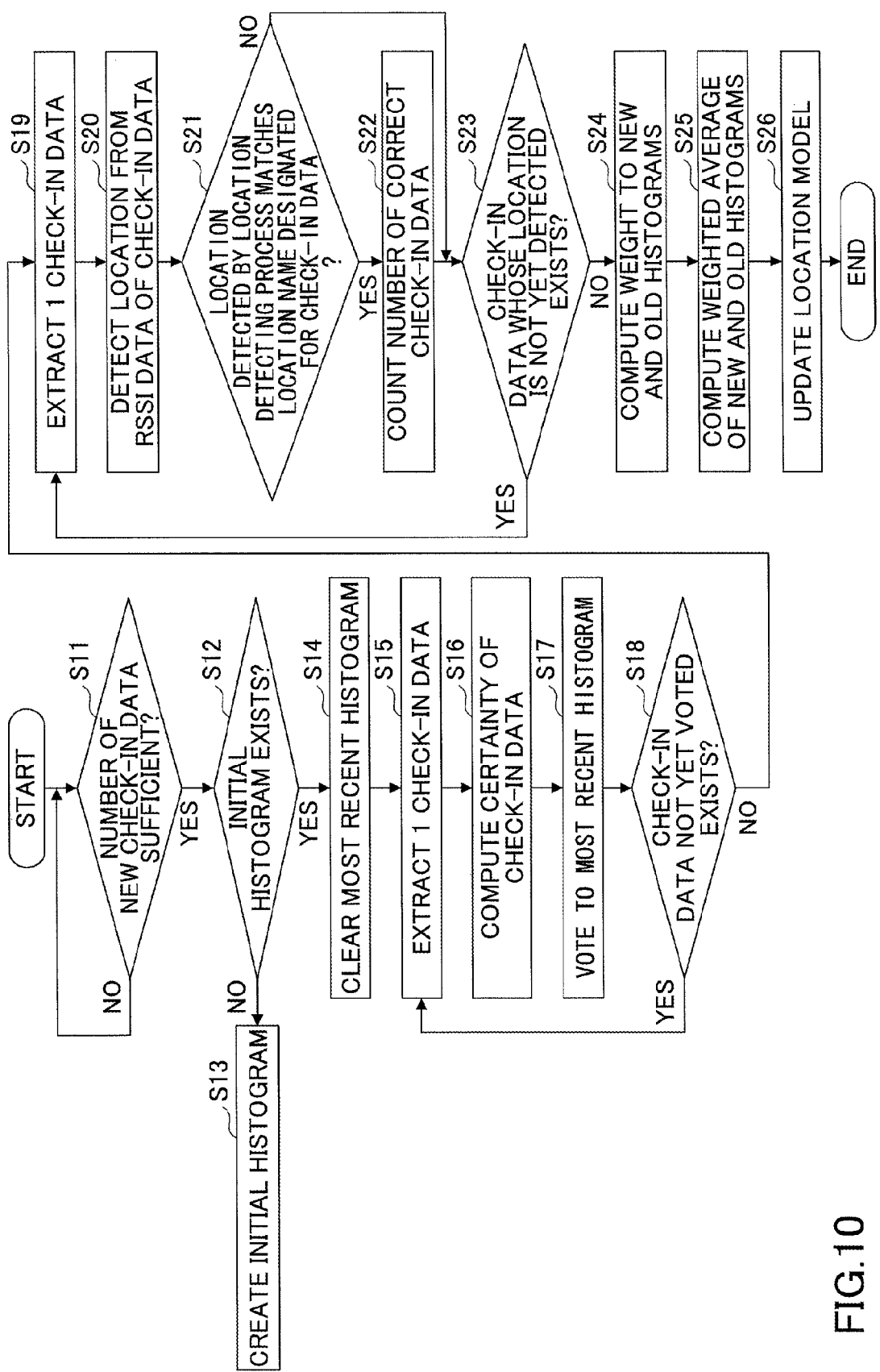
FIG. 10 is a flow chart for explaining an example of a process of the location model updating apparatus.

FIG. 10 is a flow chart for explaining an example of a process of the location model updating apparatus 80 illustrated in FIG. 9. In this example, the process illustrated in FIG. 10 is performed when the processor of the server 21 executes the program stored in the storage unit of the server 21. In FIG. 10, processes of steps S11 through S17 correspond to the processes of the first stage described above, and processes of steps S18 through S26 correspond to the processes of the second stage described above.

In FIG. 10, the processor in step S11 judges whether the number of new check-in data is sufficiently large. The process advances to step S12 when the judgment result in step S11 becomes YES. In other words, a judgment is made to determine whether the number of new check-in data uploaded to the server 21 is greater than a predetermined value, and if not, the processor of the server 21 waits until the number of new check-in data uploaded to the server 21 becomes greater than the predetermined value. When the judgment result in step S11 is YES, the processor in step S12 judges whether the initial histogram is stored in the storage unit of the server 21. The process advances to step S13 when the judgment result in step S12 is NO. The processor in step S13 creates the initial histogram according to procedures described above. The process may return to step S11 after step S13, or the process may end after step S13.

On the other hand, when the judgment result in step S12 is YES, the processor in step S14 clears the most recent histogram stored in the storage unit of the server 21, and prepares a region to store the most recent histogram. The processor in step S15 extracts one check-in data. The processor in step S16 uses the previous histogram (initial histogram in the case of a first updating) to compute a certainty that the RSSI data included in the extracted check-in data is definitely the data uploaded at the location having the location name included in the check-in data. The processor in step S17 votes to the most recent histogram by using the certainty of the check-in data computed in step S16 as the number of votes of this check-in data. The processor in step S18 judges whether check-in data that has not yet voted exists, and the process returns to step S15 when the judgment result in step S18 is YES.

On the other hand, when the judgment result in step S18 is NO, the processor in step S19 extracts one check-in data. The processor in step S20 performs a location detecting process using the histogram up to that point in time, based on the RSSI data included in the check-in data. The processor in step S21 judges whether the location detected by the location detecting process matches the location name designated for the check-in data. The process advances to step S22 when the judgment result in step S21 is YES, and the process advances to step S23 when the judgment result in step S21 is NO. The processor in step S22 increments, by one, a count of a counter that counts the number of correct check-in data (or a ratio of correct check-in data), and the process advances to step S23.

The processor in step S23 judges whether the check-in data whose location has not yet been detected exists, and the process returns to step S19 when the judgment result in step S23 is YES. When the judgment result in step S23 is NO, the processor in step S24 computes the weights of the new and old histograms, that is, the weight of the most recent histogram and the weight of the previous histogram. For example, the weights of the new and old histograms may be computed based on the number of correct check-in data (or a ratio of correct check-in data) obtained when updating the previous histogram, and the number of correct check-in data (or a ratio of correct check-in data) counted in step S22. The processor in step S25 computes a weighted averages of the new and old histograms, that is the weighted average of the most recent histogram and the weighted average of the previous histogram. The processor in step S26 updates the previous histogram based on the weighted averages of the new and old histograms, and stores the updated, previous histogram into the storage unit of the server 21 as the current histogram, to thereby update the location model, and the process ends.

Accordingly in this embodiment, the certainty of each check-in data is obtained based on the previous histogram, and the number of votes of each check-in data is determined according to the certainty that is obtained, in order to create the most recent histogram by the voting of each check-in data. In addition, the ratio of the correct check-in data within each most recent check-in data is obtained, based on the result of the location detecting process using the previous histogram, and the ratio that is obtained and the previously obtained ratio are used as weights of the most recent histogram and the previous histogram, respectively. Further, the weighted average of the most recent histogram and the weighted average of the previous histogram are used to update the previous histogram.

The number of votes of the erroneous check-in data is small, and for this reason, the effects of the erroneous check-in data on the creation of the most recent histogram can be reduced. In addition, because the weights of the previous histogram and the most recent histogram are computed based on the ratio of the correct check-in data, more weight is placed on the correct check-in data having the larger ratio, and the effects of the erroneous check-in data on the creation of the most recent histogram can be reduced. Further, the histogram that is created in the manner described above may follow changes in daily activities, such as gradual changes in the RSSI levels caused by moving of furniture or the like indoors, for example.

Next, a description will be given of an example of the process executed by the location model updating apparatus 80, by referring to FIG. 11.

Figure 11:
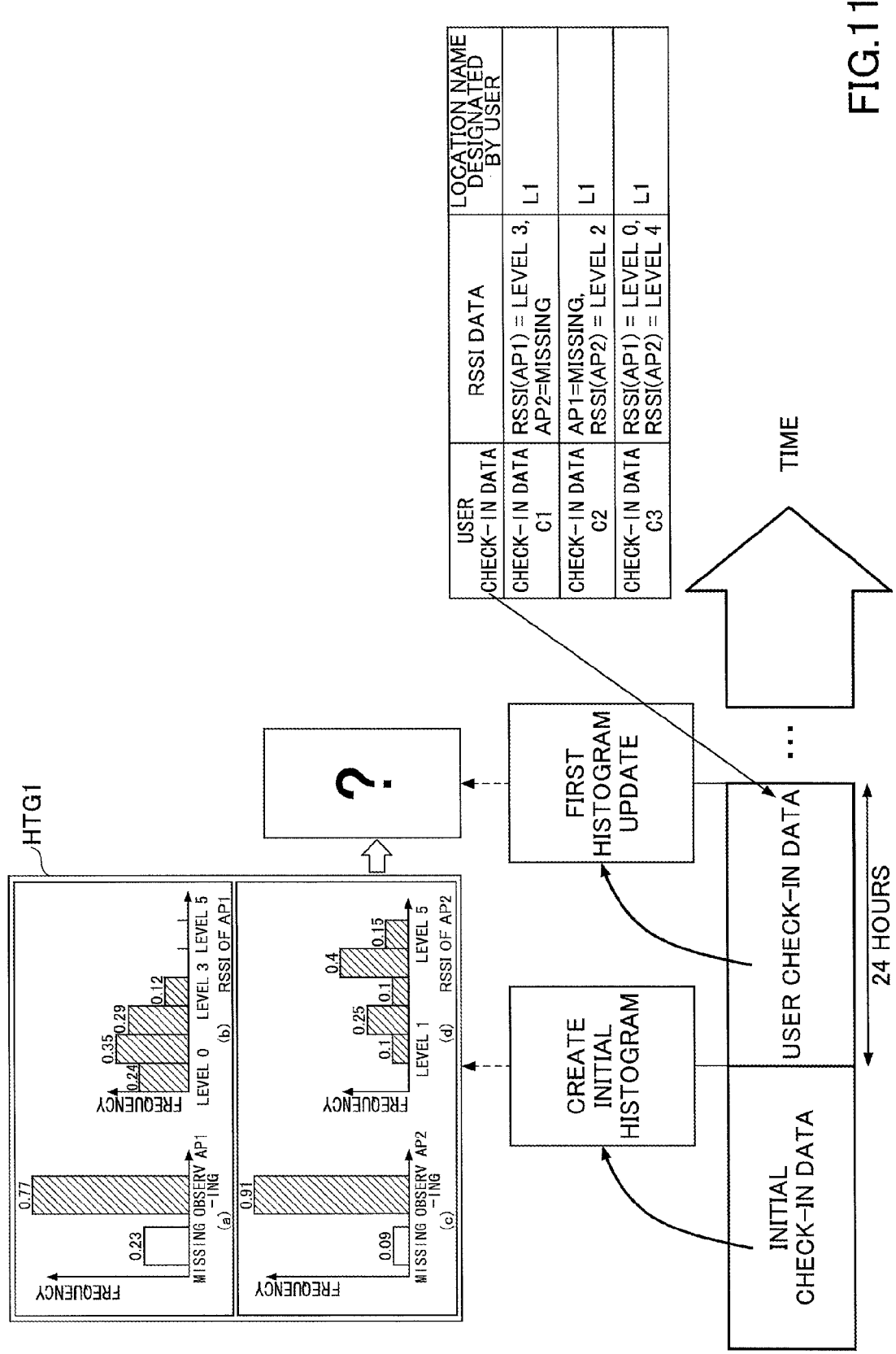
FIG. 11 is a diagram for explaining an example of a first histogram update.

FIG. 11 is a diagram for explaining an example of a first histogram update. FIG. 11 illustrates an example of the first histogram update for a case in which the initial histogram is already created, and 3 check-in data are received during a time from after the initial histogram is created to when the first histogram update is made. An update time in which one histogram update is made is 24 hours, for example. In FIG. 11, those parts that are the same as those corresponding parts in FIG. 8 are designated by the same reference numerals, and a description thereof will be omitted.

In FIG. 11, at the time of creating the initial histogram, the initial histogram at the location having the location name L1 indicated in HTG1 is already created based on the initial check-in data from the manager. Hence, the first histogram update is made based on the check-in data from the user. In this example, 3 user check-in data C1 through C3 are uploaded to the server 21. Each of the user check-in data C1 through C3 includes the RSSI data, and the location name designated by the user. In the example illustrated in FIG. 11, the RSSI data of the user check-in data C1 includes the RSSI RSSI(AP1) of the AP AP1 having the RSSI level 3, and the RSSI of the AP AP2 is missing. In addition, the RSSI data of the user check-in data C2 includes the RSSI RSSI(AP2) of the AP AP2 having the RSSI level 2, and the RSSI of the AP AP1 is missing. The RSSI data of the user check-in data C3 includes the RSSI RSSI(AP1) of the AP AP1 having the RSSI level 0, and the RSSI RSSI(AP2) of the AP AP2 having the RSSI level 4. In this example, the location name designated by the user is L1 in each of the user check-in data C1 through C3.

When computing the certainty of the check-in data at the first stage, a reference is made to the past histogram (initial histogram in this example), and the certainty is obtained from a product of the missing probability of the observable AP missing within the check-in data and the observing probability of the RSSI of the observable AP within the check-in data. As a result, the RSSI data of the user check-in data C1 is level 3 for RSSI(AP1), missing for AP2, and L1 for the location name designated by the user. The certainty of the user check-in data for this case is [Probability of RSSI(AP1)]×[Missing Probability of AP2]=0.12×0.09=0.011. Similarly, the RSSI data of the user check-in data C2 is missing for AP1, level 2 for RSSI(AP2), and L1 for the location name designated by the user, and the certainty for this case is 0.057. Further, the RSSI data of the user check-in data C3 is level 0 for RSSI (AP1), level 4 for RSSI(AP2), and L1 for the location name designated by the user, and the certainty for this case is 0.096.

When generating the most recent histogram at the first stage, the certainty of each check-in data is regarded as the number of votes of each check-in data. In other words, the larger the certainty of the check-in data, the larger the number votes. The number of votes may take a value from 0 to 1.0. When each check-in data votes to the most recent histogram, the number of votes is added to bins of the RSSI levels from the observed APs AP1 and AP2. Hence, the most recent histograms at the location having the location name L1 become as illustrated in FIGS. 12A, 12B, 12C, and 12D.

FIGS. 12A, 12B, 12C, and 12D are diagrams illustrating examples of the most recent histograms at the location having the location name L1 for a case in which the RSSI data of the check-in data C1 has the level 3 for the AP AP1 (that is, RSSI(AP1)=3) and missing for the AP AP2, the certainty (or number of votes) of the check-in data C1 is 0.011, and the RSSI data of the check-in data C2 is missing for the AP AP1 and has the level 2 for the AP AP2 (that is, RSSI(AP2)=2), the certainty (or number of votes) of the check-in data C2 is 0.057, the RSSI data of the check-in data C3 has the level 0 for the AP AP1 (that is, RSSI(AP1)=0) and has the level 4 for the AP AP2 (that is, RSSI(AP2)=4), and the certainty (or number of votes) of the check-in data C3 is 0.096. FIG. 12A illustrates the missing and observing histograms for the AP AP1, FIG. 12B illustrates the RSSI histogram for the AP AP1, FIG. 12C illustrates the missing and observing histograms for the AP AP2, and FIG. 12D illustrates the RSSI histogram for the AP AP2. In FIGS. 12A through 12D, the number of votes of the check-in data C1 is indicated by a rightwardly descending hatching, the number of votes of the check-in data C2 is indicated by a leftwardly descending hatching, and the number of votes of the check-in data C3 is indicated by a vertical stripe hatching.

When normalizing the most recent histogram at the first stage, the missing and observing histograms are normalized so that a sum of the missing and observing bins of the missing and observing histograms becomes 1.0, for example, and the RSSI histogram is normalized so that a sum of the bins of all levels (levels 0 to 5 in this example) becomes 1.0. Hence, the most recent histograms at the location having the location name L1 after the normalization become as illustrated in FIGS. 13A, 13B, 13C, and 13D. FIGS. 13A, 13B, 13C, and 13D are diagrams illustrating examples of the most recent histograms after normalization at the location having the location name L1. FIG. 13A illustrates the missing and observing histograms for the AP AP1, FIG. 13B illustrates the RSSI histogram for the AP AP1, FIG. 13C illustrates the missing and observing histograms for the AP AP2, and FIG. 13D illustrates the RSSI histogram for the AP AP2.

When updating the histograms at the second stage, weights to be used to compute the weighted average of the previous histogram and the most recent histogram are obtained. As described above, the check-in data includes the RSSI data and the location name designated by the user. In addition, the location detecting function is used to detect the location from the RSSI data, based on the previous histograms at each of the locations having the location names L1, L2, L3, . . . . When the location name of the location detected by the location detecting function and the location designated by the user match, the check-in data is counted as an error-free check-in data, and a ratio of the error-free check-in data (that is, a ratio of the correct check-in data) is computed. The ratio of the current correct check-in data is obtained by dividing a total number of error-free check-in data by a total number of check-in data.

The weighted average of the previous histogram and the most recent histogram increases the effects of the histogram having the larger ratio of the correct check-in data. Hence, when generating the current histogram by combining the most recent histogram and the previous histogram with the weighted average, the current histogram may be generated according to the following formula.

(Current Histogram)={(Ratio of Previous Correct Check-In Data)×(Previous Histogram)+(Ratio of Current Correct Check-In Data)×(Most Recent Histogram)}/{(Ratio of Previous Correct Check-In Data)+(Ratio of Correct Current Check-In Data)}

At the second stage, the weight of the histogram update can be computed by computing the ratio of the correct check-in data based on location detection results with respect to each check-in data illustrated in FIG. 14. FIG. 14 is a diagram illustrating an example of the location detection results with respect to each of the check-in data C1 through C3. In FIG. 14, "Location L1" denotes the location having the location name L1, and "Location L2" denotes the location having the location name L2. In addition, "O" indicates the correct check-in data, and "X" indicates the erroneous (or incorrect) check-in data. In this example, the ratio of the current correct check-in data is obtained by dividing the total number of error-free check-in data by the total number of check-in data, that is, 2/3=0.67. The weight of the histogram update is set by assuming that all initial check-in data used to create the initial histogram are correct, and the weight of the previous histogram is set to 1.0 and the weight of the most recent histogram is set to 2/3=0.67.

Figure 15:
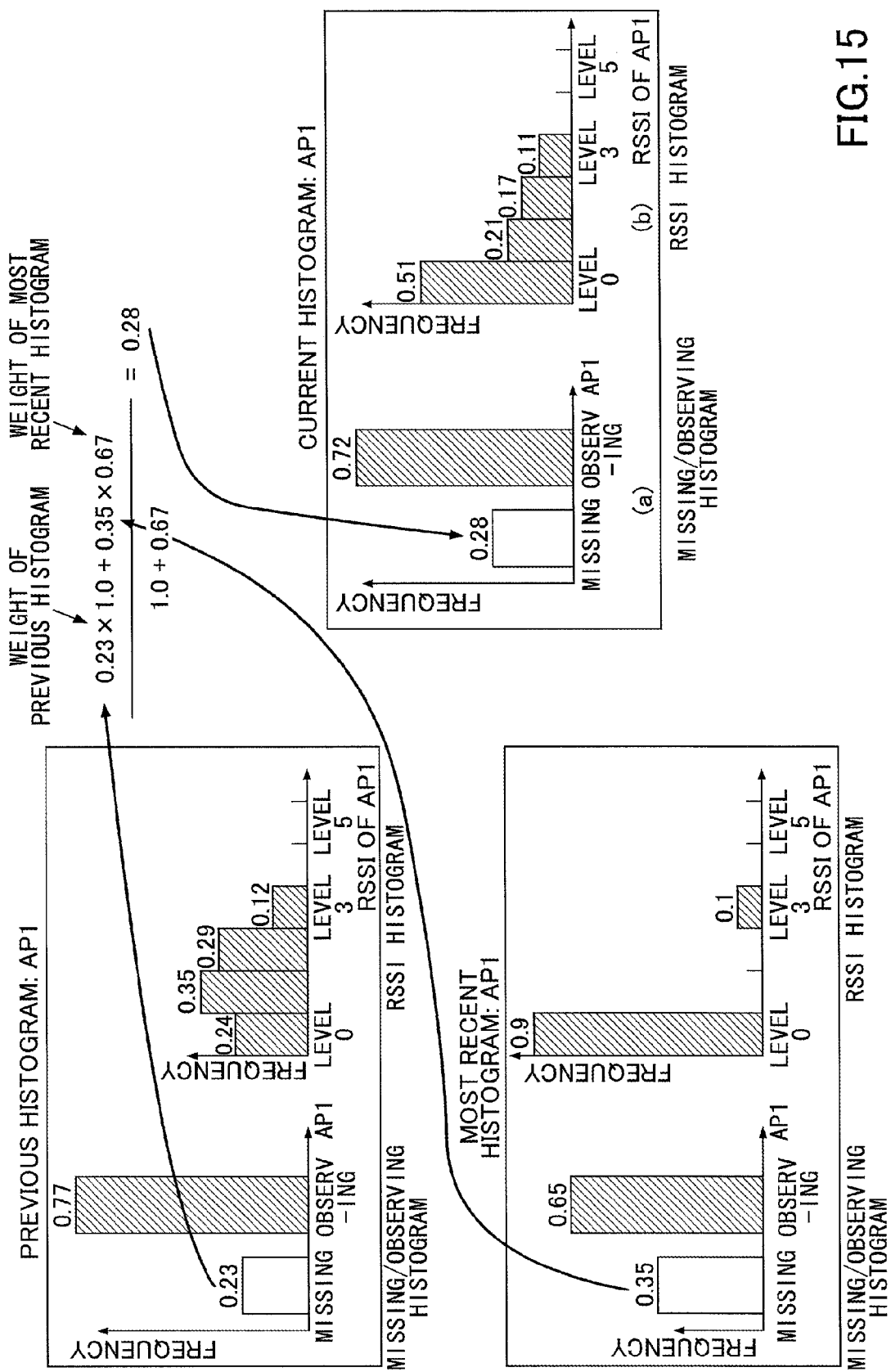
FIG. 15 is a diagram for explaining an update of the histogram of an AP AP1.
Figure 16:
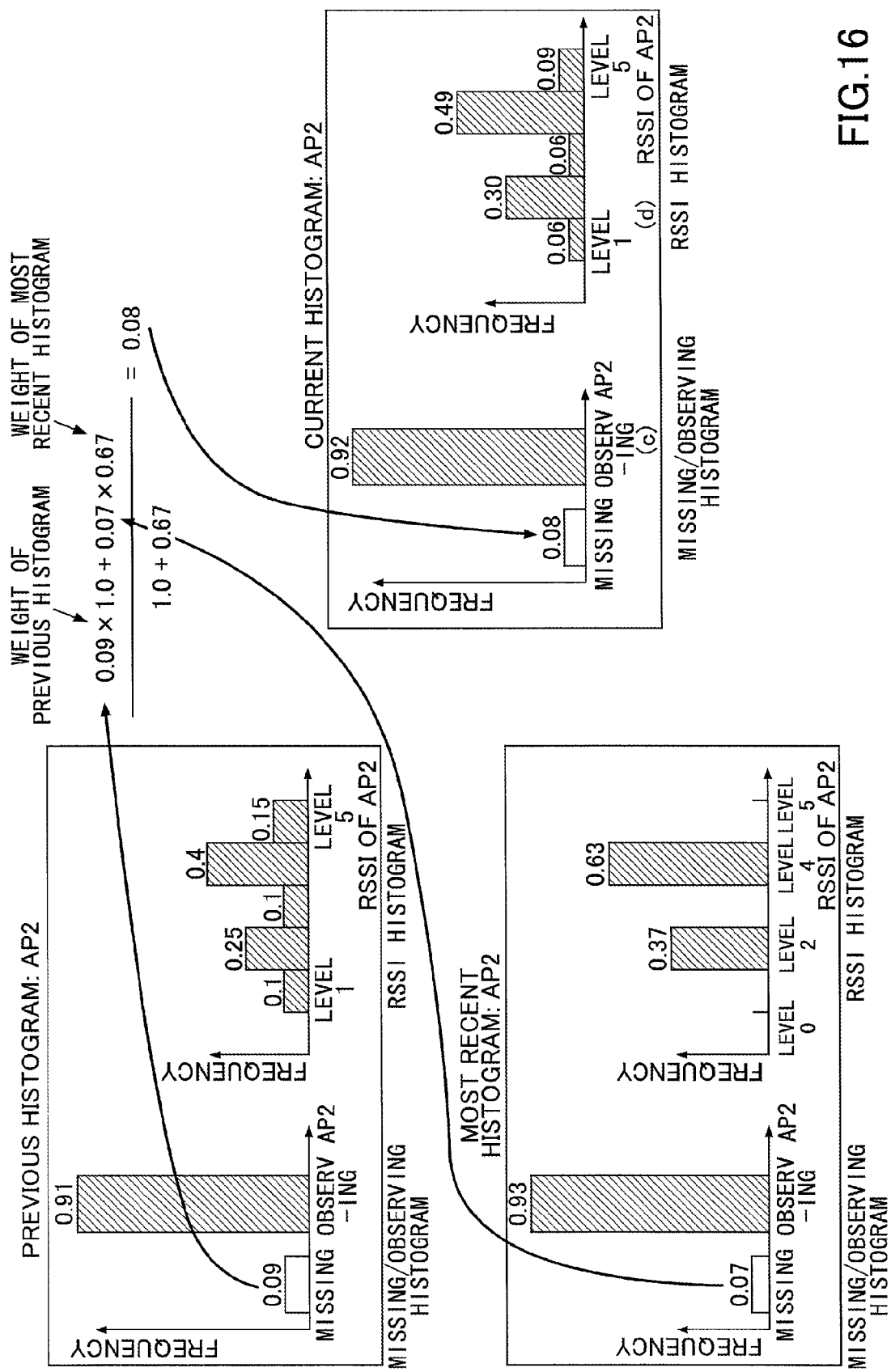
FIG. 16 is a diagram for explaining an update of the histogram of an AP AP2.

Accordingly, at the second stage, the histogram of the AP AP1 at the location having the location name L1 is updated as illustrated in FIG. 15, and the histogram of the AP AP2 at the location having the location name L1 is updated as illustrated in FIG. 16.

FIG. 15 is a diagram for explaining the update of the histogram of the AP AP1. In FIG. 15, those parts that are the same as those corresponding parts in FIG. 8 are designated by the same reference numerals, and a description thereof will be omitted. In the example illustrated in FIG. 15, the weight of the previous histogram is 1.0, and the weight of the most recent histogram is 0.67. Hence, from (0.23×1.0+0.35×0.67)/(1.0+0.67)=0.28, the missing and observing histograms and the RSSI histogram in the current histogram of the AP AP1 are updated as illustrated in (a) and (b) of FIG. 15.

FIG. 16 is a diagram for explaining the update of the histogram of the AP AP2. In FIG. 16, those parts that are the same as those corresponding parts in FIG. 8 are designated by the same reference numerals, and a description thereof will be omitted. In the example illustrated in FIG. 16, the weight of the previous histogram is 1.0, and the weight of the most recent histogram is 0.67. Hence, from (0.09×1.0+0.07×0.67)/(1.0+0.67)=0.08, the missing and observing histograms and the RSSI histogram in the current histogram of the AP AP2 are updated as illustrated in (c) and (d) of FIG. 16.

Figure 17:
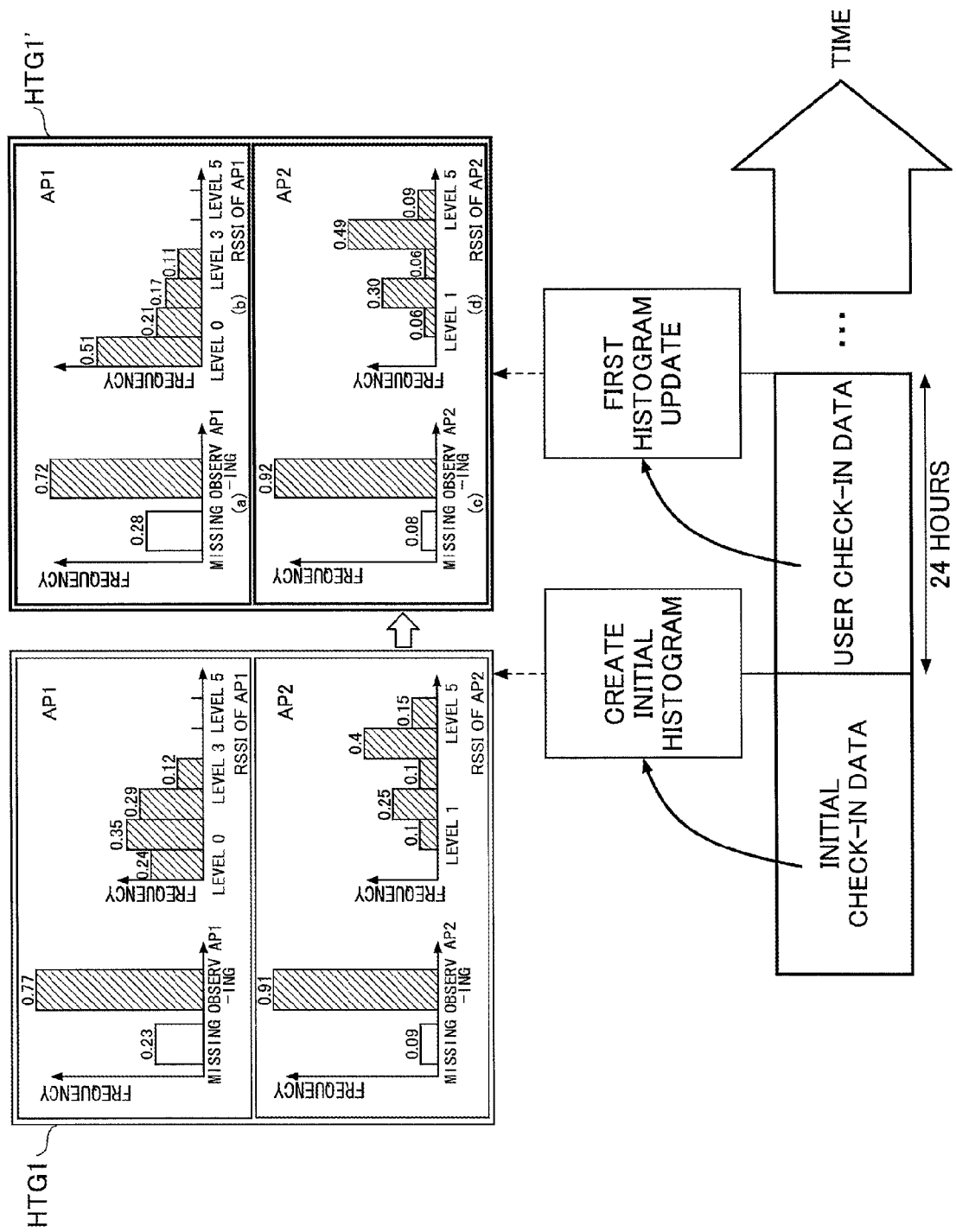
FIG. 17 is a diagram for explaining results after the first histogram update.

Accordingly, after the first histogram update illustrated in FIG. 11, a histogram HTG1' at the location having the location name L1 becomes as illustrated in FIG. 17, which corresponds to the histograms illustrated in (a) and (b) of FIG. 15 and (c) and (d) of FIG. 16. FIG. 17 is a diagram for explaining results after the first histogram update. In FIG. 17, those parts that are the same as those corresponding parts in FIG. 11 are designated by the same reference numerals, and a description thereof will be omitted.

Figure 18:
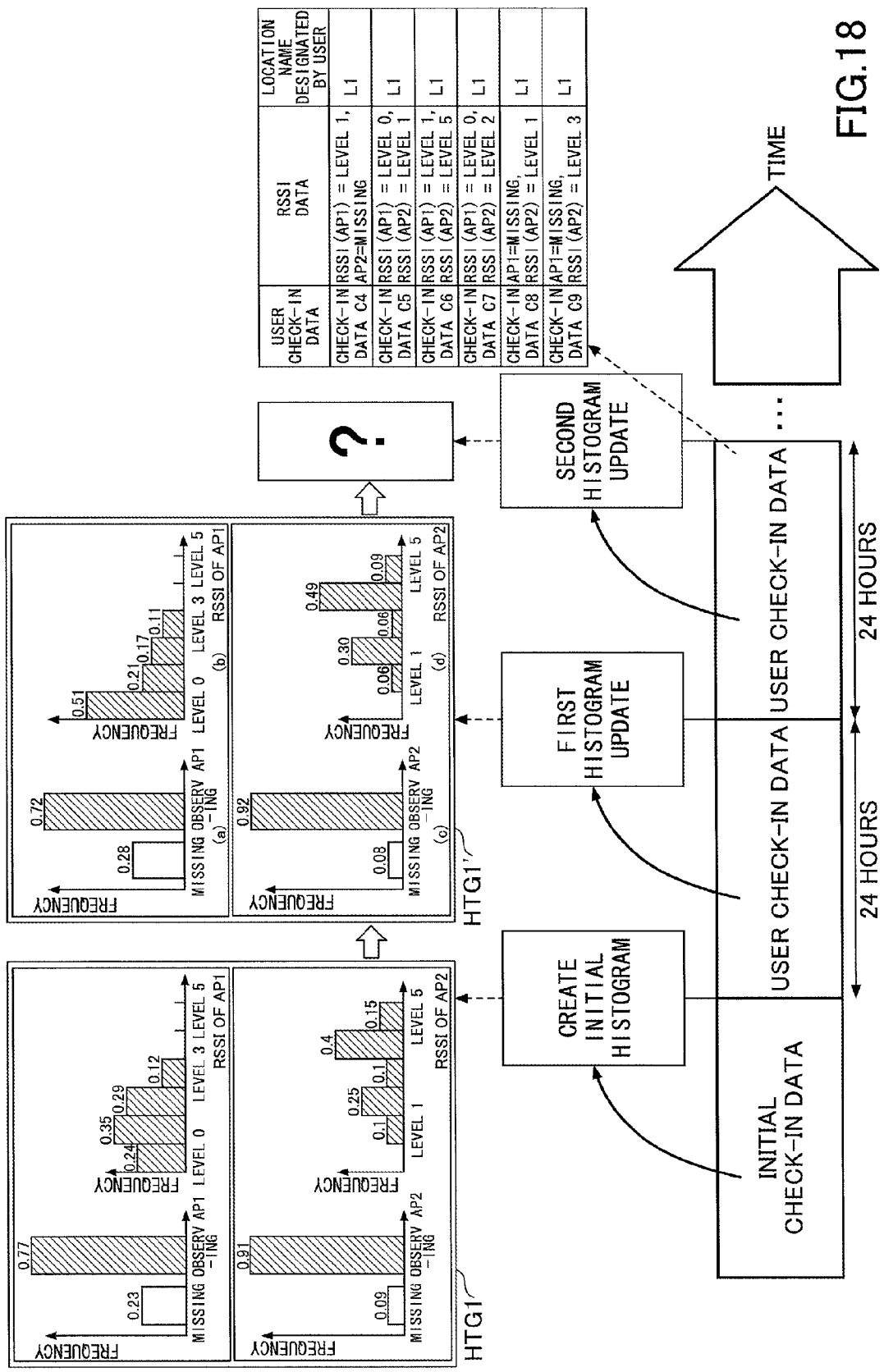
FIG. 18 is a diagram for explaining an example of a second histogram update.

FIG. 18 is a diagram for explaining an example of a second histogram update. FIG. 18 illustrates the second histogram update for a case in which, after the first histogram update, 6 check-in data are obtained before the second histogram update. In FIG. 18, those parts that are the same as those corresponding parts in FIG. 11 are designated by the same reference numerals, and a description thereof will be omitted.

In FIG. 18, at the time of the second histogram update, because the first histogram at the location having the location name L1, indicated by HTG1', is already updated based on the user check-in data, the second histogram update is made based on the user check-in data. In this example, 6 user check-in data C4 through C9 are uploaded to the server 21. Each of the user check-in data C4 through C9 includes the RSSI data and the location name designated by the user. In the example illustrated in FIG. 18, the RSSI data of the user check-in data C4 includes the RSSI RSSI(AP1) of the AP AP1 having the RSSI level 1, and the RSSI of the AP AP2 is missing. In addition, the RSSI data of the user check-in data C5 includes the RSSI RSSI(AP1) of the AP AP1 having the RSSI level 0, and the RSSI RSSI(AP2) of the AP AP2 having the RSSI level 1. The RSSI data of the user check-in data C6 includes the RSSI RSSI(AP1) of the AP AP1 having the RSSI level 1, and the RSSI RSSI(AP2) of the AP AP2 having the RSSI level 5. The RSSI data of the user check-in data C7 includes the RSSI RSSI(AP1) of the AP AP1 having the RSSI level 0, and the RSSI RSSI(AP2) of the AP AP2 having the RSSI level 2. The RSSI data of the user check-in data C8 includes the RSSI RSSI(AP2) of the AP AP2 having the RSSI level 1, and the RSSI of the AP AP1 is missing. The RSSI data of the user check-in data C9 includes the RSSI RSSI(AP2) of the AP AP2 having the RSSI level 3, and the RSSI of the AP AP1 is missing. In this example, the location name designated by the user is L1 in each of the user check-in data C4 through C9.

Computing the certainty of the check-in data, generating the most recent histogram, and normalizing the most recent histogram at the first stage may be carried out in a manner similar to that at the time of the first histogram update described above, and illustration and description thereof will be omitted. In addition, updating the histogram and computing the weight of the histogram update at the second stage may be carried out in a manner similar to that at the time of the first histogram update described above.

At the second stage, the weight of the histogram update can be computed by computing the ratio of the correct check-in data based on location detection results with respect to each check-in data illustrated in FIG. 19. FIG. 19 is a diagram illustrating an example of the location detection results with respect to each of the check-in data C4 through C9. In FIG. 19, the same designations are used as in FIG. 14. In this example, the weight of the previous histogram is set to 2/3=0.67, and the weight of the most recent histogram is set to 5/6=0.83.

Figure 20:
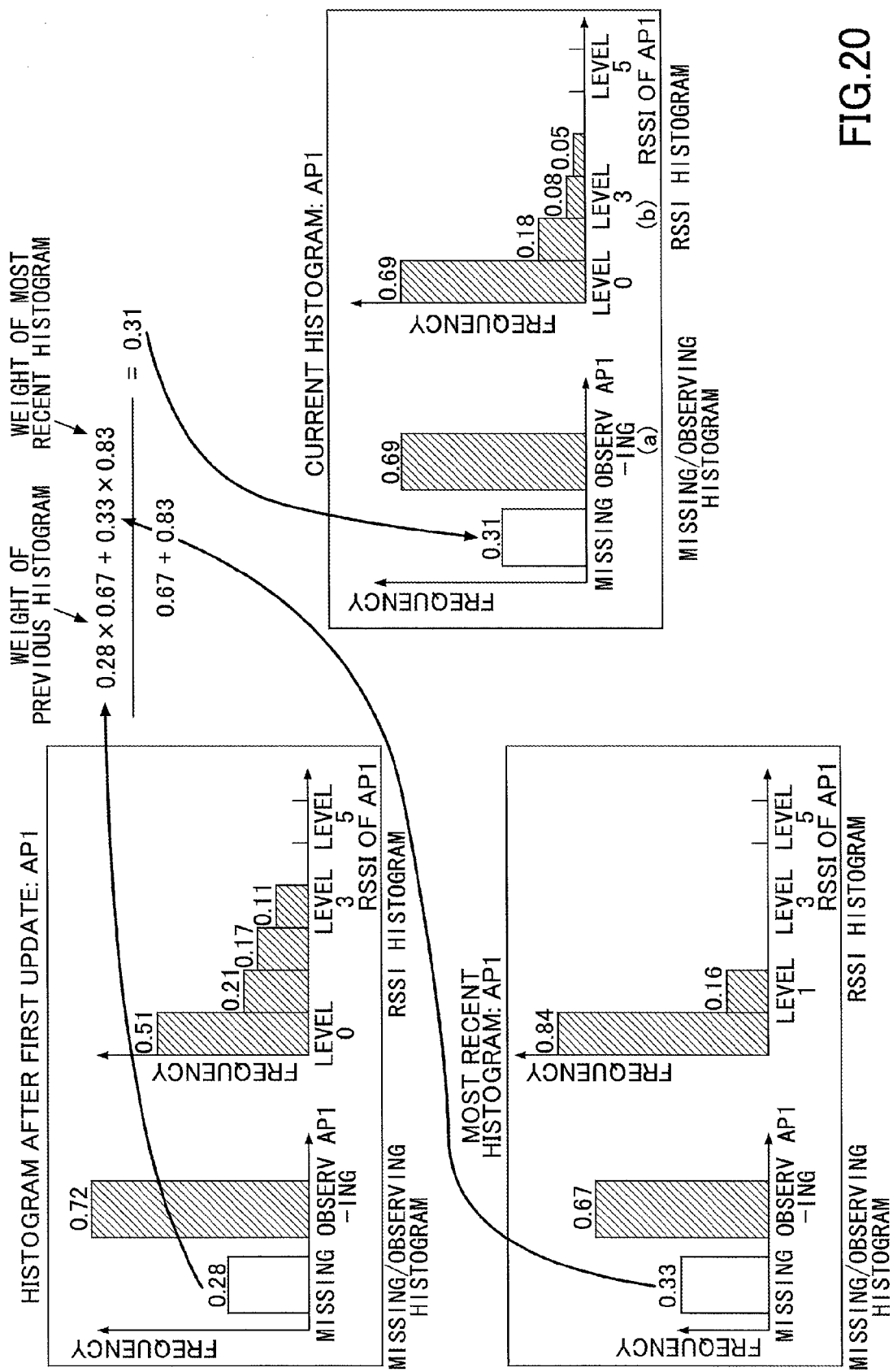
FIG. 20 is a diagram for explaining the update of the histogram of the AP AP1.
Figure 21:
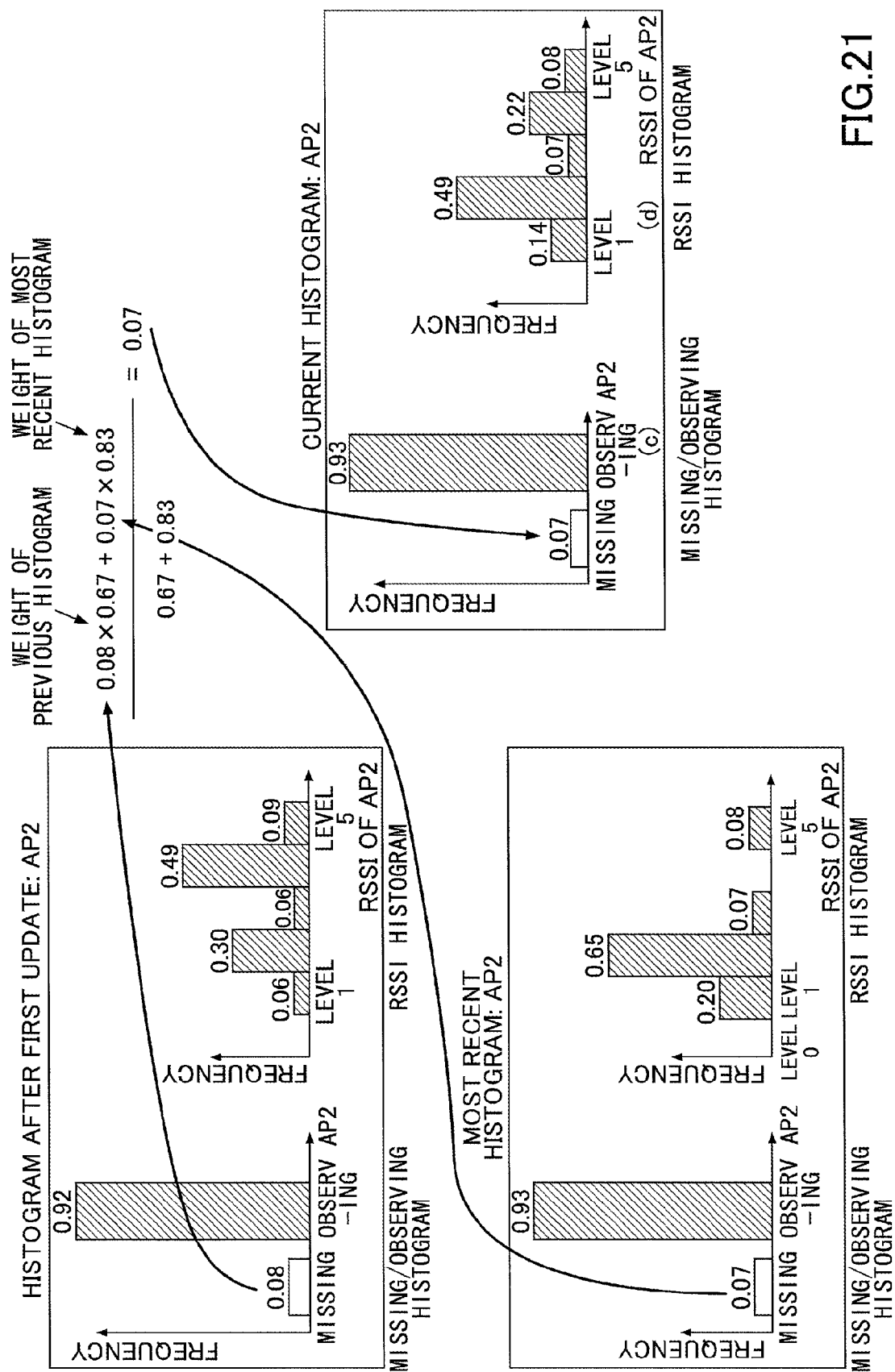
FIG. 21 is a diagram for explaining the update of the histogram of the AP AP2.

Accordingly, at the second stage, the histogram of the AP AP1 at the location having the location name L1 is updated as illustrated in FIG. 20, and the histogram of the AP AP2 at the location having the location name L1 is updated as illustrated in FIG. 21.

FIG. 20 is a diagram for explaining the update of the histogram of the AP AP1. In FIG. 20, those parts that are the same as those corresponding parts in FIG. 15 are designated by the same reference numerals, and a description thereof will be omitted. In the example illustrated in FIG. 20, the weight of the previous histogram is 0.67, and the weight of the most recent histogram is 0.83. Hence, from (0.28×0.67+0.33×0.83)/(0.67+0.83)=0.31, the missing and observing histograms and the RSSI histogram in the current histogram of the AP AP1 are updated as illustrated in (a) and (b) of FIG. 20.

FIG. 21 is a diagram for explaining the update of the histogram of the AP AP2. In FIG. 21, those parts that are the same as those corresponding parts in FIG. 16 are designated by the same reference numerals, and a description thereof will be omitted. In the example illustrated in FIG. 21, the weight of the previous histogram is 0.67, and the weight of the most recent histogram is 0.83. Hence, from (0.08×0.67+0.07×0.83)/(0.67+0.83)=0.07, the missing and observing histograms and the RSSI histogram in the current histogram of the AP AP2 are updated as illustrated in (c) and (d) of FIG. 21.

Figure 22:
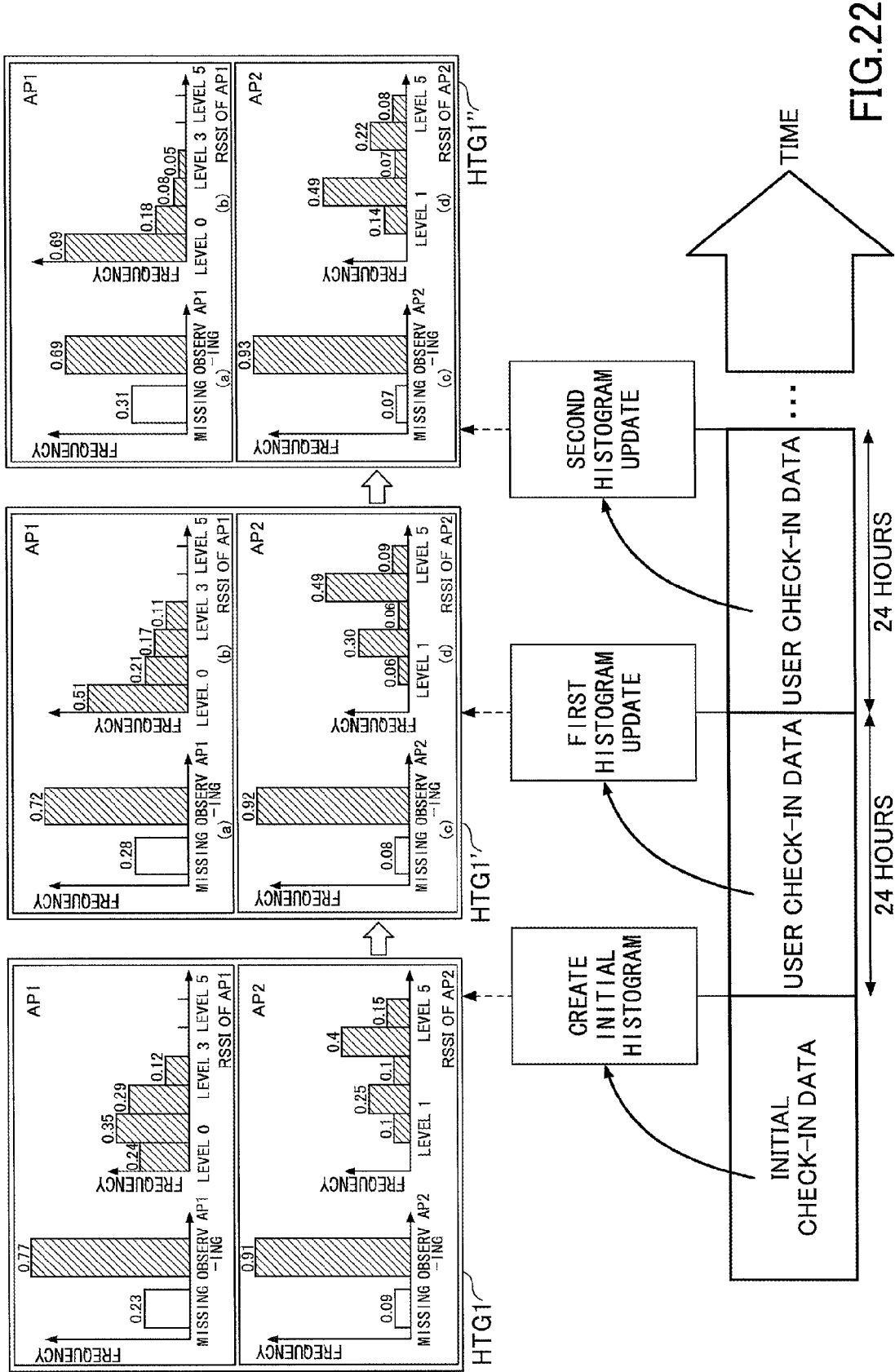
FIG. 22 is a diagram for explaining results after the second histogram update.

Accordingly, after the second histogram update illustrated in FIG. 18, a histogram HTG1" at the location having the location name L1 becomes as illustrated in FIG. 22, which corresponds to the histograms illustrated in (a) and (b) of FIG. 20 and (c) and (d) of FIG. 21. FIG. 22 is a diagram for explaining results after the second histogram update. In FIG. 22, those parts that are the same as those corresponding parts in FIG. 17 are designated by the same reference numerals, and a description thereof will be omitted.

Third and subsequent histogram updates may be carried out in a manner similar to that of the second histogram update described above. Hence, the location model may be updated at the server, based on the user check-in data uploaded to the server 21.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A location model updating apparatus to update a location model based on data uploaded from a mobile terminal, comprising:
   a storage unit; and
   a processor configured to perform an updating process in two stages including a first stage and a second stage,
   wherein the first stage includes
      computing a certainty of data observed at a location having a location name designated by a user of the mobile terminal, based on a previous histogram stored in the storage unit, for each of most recent check-in data uploaded during a time from a previous histogram updating to a current histogram updating, and using the computed certainty as a number of votes to a histogram indicating a reception state of data from each base station at the location of the mobile terminal; and
      generating a most recent histogram based on the number of votes to the histogram computed for each of the most recent check-in data, and
   wherein the second stage includes
      detecting the location using the previous histogram, based on a received signal strength included in each of the most recent check-in data, in order to judge whether the check-in data is correct, depending on whether a location name of the detected location matches the location name designated by the user and included in each of the most recent check-in data;
      obtaining a ratio of correct check-in data within each of the most recent check-in data, to compute a weight of the most recent histogram and a weight of the previous histogram from a ratio of correct check-in data currently obtained and a ratio of correct check-in data previously obtained; and
      updating the previous histogram based on the weight of the most recent histogram and the previous histogram, in order to update the location model by storing the previous histogram that is updated, as the current histogram, in the storage unit.

2. The location model updating apparatus as claimed in claim 1, wherein the histogram indicates a missing frequency of data from each base station being observed, an observing frequency of data from each base station being observed, and a received signal strength from each base station, at the location of the mobile terminal.

3. The location model updating apparatus as claimed in claim 1, wherein the generating the most recent histogram includes
   judging whether an initial histogram is stored in the storage unit when a number of most recent check-in data greater than or equal to a predetermined value is uploaded, and
   creating the initial histogram when no initial histogram is stored in the storage unit.

4. The location model updating apparatus as claimed in claim 1, wherein
   the detecting detects the location by counting a number of correct check-in data when the location name of the detected location matches the location name designated by the user and included in each of the most recent check-in data,
   the obtaining obtains the ratio of the correct check-in data by computing a weighted average of the most recent histogram and a weighted average of the previous histogram, based on the weights of the most recent histogram and the previous histogram, the number of correct check-in data obtained when updating the previous histogram, and the number of correct check-in data that is counted, and the updating updates the previous histogram based on the weighted average of the most recent histogram and the weighted average of the previous histogram, in order to update the location model by storing the previous histogram that is updated, as the current histogram, in the storage unit.

5. A position estimating method to estimate a position of a mobile terminal that is communicable with a plurality of base stations, comprising:

estimating, in the mobile terminal, the position of the mobile terminal based on a location model stored within the mobile terminal;

updating, in the mobile terminal, the location model based on data downloaded from a server; and performing a location model updating process in two stages including a first stage and a second stage, in the server, to update the location model stored in a storage unit of the server, based on data uploaded from the mobile terminal, wherein the first stage includes computing a certainty of data observed at a location having a location name designated by a user of the mobile terminal, based on a previous histogram stored in the storage unit, for each of most recent check-in data uploaded during a time from a previous histogram updating to a current histogram updating, and using the computed certainty as a number of votes to a histogram indicating a reception state of data from each of the plurality of base stations at the location of the mobile terminal; and generating a most recent histogram based on the number of votes to the histogram computed for each of the most recent check-in data, and wherein the second stage includes detecting the location using the previous histogram, based on a received signal strength included in each of the most recent check-in data, in order to judge whether the check-in data is correct, depending on whether a location name of the detected location matches the location name designated by the user and included in each of the most recent check-in data;

obtaining a ratio of correct check-in data within each of the most recent check-in data, and compute a weight of the most recent histogram and a weight of the previous histogram from a ratio of correct check-in data currently obtained and a ratio of correct check-in data previously obtained; and updating the previous histogram based on the weight of the most recent histogram and the weight of the previous histogram, in order to update the location model by storing the previous histogram that is updated, as the current histogram, in the storage unit.

6. The position estimating method as claimed in claim 5, wherein the histogram indicates a missing frequency of data from each of the plurality of base stations being observed, an observing frequency of data from each of the plurality of base stations being observed, and a received signal strength from each of the plurality of base stations, at the location of the mobile terminal.

7. The position estimating method as claimed in claim 5, wherein the generating includes judging whether an initial histogram is stored in the storage unit when a number of most recent check-in data greater than or equal to a predetermined value is uploaded, and creating the initial histogram when no initial histogram is stored in the storage unit.

8. The position estimating method as claimed in claim 5, wherein the detecting includes counting a number of correct check-in data when the location name of the detected location matches the location name designated by the user and included in each of the most recent check-in data, the obtaining includes computing a weighted average of the most recent histogram and a weighted average of the previous histogram, based on the weights of the most recent histogram and the previous histogram, the number of correct check-in data obtained when updating the previous histogram, and the number of correct check-in data that is counted, and the updating includes updating the previous histogram based on the weighted average of the most recent histogram and the weighted average of the previous histogram, in order to update the location model by storing the previous histogram that is updated, as the current histogram, in the storage unit.

9. A non-transitory computer-readable storage medium having stored therein a program for causing a computer to execute a process in two stages to update a location model based on data uploaded from a mobile terminal, the two stages of the process comprising:

a first stage including computing a certainty of data observed at a location having a location name designated by a user of the mobile terminal, based on a previous histogram stored in a storage unit, for each of most recent check-in data uploaded during a time from a previous histogram updating to a current histogram updating, and using the computed certainty as a number of votes to a histogram indicating a reception state of data from each base station at the location of the mobile terminal; and generating a most recent histogram based on the number of votes to the histogram computed for each of the most recent check-in data, and a second stage including detecting the location using the previous histogram, based on a received signal strength included in each of the most recent check-in data, in order to judge whether the check-in data is correct, depending on whether a location name of the detected location matches the location name designated by the user and included in each of the most recent check-in data;

obtaining a ratio of correct check-in data within each of the most recent check-in data, and compute a weight of the most recent histogram and a weight of the previous histogram from a ratio of correct check-in data currently obtained and a ratio of correct check-in data previously obtained; and updating the previous histogram based on the weight of the most recent histogram and the weight of the previous histogram, in order to update the location model by storing the previous histogram that is updated, as the current histogram, in the storage unit.

10. The non-transitory computer-readable storage medium as claimed in claim 9, wherein the histogram indicates a missing frequency of data from each base station being observed, an observing frequency of data from each base station being observed, and a received signal strength from each base station, at the location of the mobile terminal.

11. The non-transitory computer-readable storage medium as claimed in claim 9, wherein the generating includes judging whether an initial histogram is stored in the storage unit when a number of most recent check-in data greater than or equal to a predetermined value is uploaded, and creating the initial histogram when no initial histogram is stored in the storage unit.

12. The non-transitory computer-readable storage medium as claimed in claim 9, wherein the detecting includes counting a number of correct check-in data when the location name of the detected location matches the location name designated by the user and included in each of the most recent check-in data, the obtaining includes computing a weighted average of the most recent histogram and a weighted average of the previous histogram, based on the weights of the most recent histogram and the previous histogram, the number of correct check-in data obtained when updating the previous histogram, and the number of correct check-in data that is counted, and the updating includes updating the previous histogram based on the weighted average of the most recent histogram and the weighted average of the previous histogram, in order to update the location model by storing the previous histogram that is updated, as the current histogram, in the storage unit.

13. The location model updating apparatus as claimed in claim 1, wherein the computing computes the certainty that an RSSI (Received Signal Strength Indicator) data included in the most recent check-in data is definitely the data uploaded at the location having the location name included in the most recent check-in data.

14. The position estimating method as claimed in claim 5, wherein the computing computes the certainty that an RSSI (Received Signal Strength Indicator) data included in the most recent check-in data is definitely the data uploaded at the location having the location name included in the most recent check-in data.

15. The non-transitory computer-readable storage medium as claimed in claim 9, wherein computing computes the certainty that an RSSI (Received Signal Strength Indicator) data included in the most recent check-in data is definitely the data uploaded at the location having the location name included in the most recent check-in data.

* * * * *